United States Patent
Soman

(10) Patent No.: US 12,058,185 B2
(45) Date of Patent: Aug. 6, 2024

(54) CHANNEL GENERATION IN A COMMUNICATION PLATFORM

(71) Applicant: Slack Technologies, Inc., San Francisco, CA (US)

(72) Inventor: Siddhi Soman, San Francisco, CA (US)

(73) Assignee: Salesforce.com, Inc., San Francisco, CA (US)

( * ) Notice: Subject to any disclaimer, the term of this patent is extended or adjusted under 35 U.S.C. 154(b) by 34 days.

(21) Appl. No.: 17/243,410

(22) Filed: Apr. 28, 2021

(65) Prior Publication Data

US 2022/0353129 A1 Nov. 3, 2022

(51) Int. Cl.
*H04L 65/1101* (2022.01)
*H04L 65/1059* (2022.01)
*H04L 65/1063* (2022.01)
*H04L 65/1069* (2022.01)

(52) U.S. Cl.
CPC ...... *H04L 65/1101* (2022.05); *H04L 65/1059* (2013.01); *H04L 65/1063* (2013.01); *H04L 65/1069* (2013.01)

(58) Field of Classification Search
CPC ........... H04L 29/06027; H04L 65/1059; H04L 65/1063; H04L 65/1069
See application file for complete search history.

(56) References Cited

U.S. PATENT DOCUMENTS

| | | | |
|---|---|---|---|
| 10,021,059 B1 * | 7/2018 | Rao | H04L 63/0428 |
| 10,346,378 B1 * | 7/2019 | Jones | G06F 16/2228 |
| 10,749,832 B1 * | 8/2020 | Schemers | G06Q 50/01 |
| 10,805,247 B1 * | 10/2020 | Cohen | H04L 51/216 |
| 10,805,386 B2 * | 10/2020 | Bourassa-Denis | G06F 16/9035 |
| 10,958,600 B1 * | 3/2021 | Annadata | H04L 51/04 |
| 2017/0048170 A1 * | 2/2017 | Smullen | H04L 67/02 |
| 2017/0364830 A1 * | 12/2017 | Vigoda | G06Q 50/01 |
| 2018/0034756 A1 * | 2/2018 | Allen | H04L 51/04 |
| 2018/0278563 A1 * | 9/2018 | Frost | H04L 51/52 |
| 2018/0287982 A1 | 10/2018 | Draeger et al. | |

(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Nicholas R Taylor
*Assistant Examiner* — Angela Widhalm De Rodriguez
(74) *Attorney, Agent, or Firm* — Lee & Hayes, P.C.

(57) ABSTRACT

Creating a new channel based on a thread or an object associated with a communication channel is described. A communication platform can receive, in association with a thread or an object, a first request to create a new channel based on the thread or the object. The communication platform can identify characteristics (e.g., users, context data, permissions data, etc.) associated with the thread or the object and can create the new channel based on first characteristics associated with the thread or the object. In some examples, the communication platform can receive, from a requesting user, a second request to associate second characteristics with the new channel. The communication platform can thus create the new channel based on the second characteristics.

20 Claims, 10 Drawing Sheets

(56) References Cited

U.S. PATENT DOCUMENTS

| | | | | |
|---|---|---|---|---|
| 2019/0173812 A1* | 6/2019 | Higgins | ............... | G06N 5/02 |
| 2020/0137018 A1* | 4/2020 | Jamison | ............... | H04L 51/046 |
| 2020/0403951 A1* | 12/2020 | Kapoor | ............... | G06Q 50/01 |
| 2021/0352039 A1* | 11/2021 | Oliner | ............... | G06F 16/9535 |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! a Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield on How Slack Became a $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Dikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

CHANNEL GENERATION IN A COMMUNICATION PLATFORM

TECHNICAL FIELD

A communication platform can leverage a network-based computing system to enable users to exchange data. In an example, users of the communication platform can communicate with other users via communication channels, such as by transmitting messages via the communication channels. In some examples, the communication platform can enable the users to initiate a thread associated with a particular message of a communication channel. The thread can include a conversation associated with the particular message that members of the communication channel can view and/or contribute to. As such, the thread can enhance data organization within a communication channel by separating the conversation from a main message feed and enable users relevant to the conversation to view the thread content. For example, a user may desire to comment on a particular message with information that may not be relevant to all members of the communication channel. The user may initiate creation of a thread from the particular message and may share the information with at least a portion of the members of the communication channel. However, threads may include limited functionality and may not be an efficient means of communication for conversations that develop over time or for conversations that span a long period of time.

BRIEF DESCRIPTION OF THE DRAWINGS

The detailed description is described with reference to the accompanying figures. In the figures, the left-most digit of a reference number identifies the figure in which the reference number first appears. The use of the same reference number in different figures indicates similar or identical components or features. The figures are not drawn to scale.

DETAILED DESCRIPTION

Figure 1:
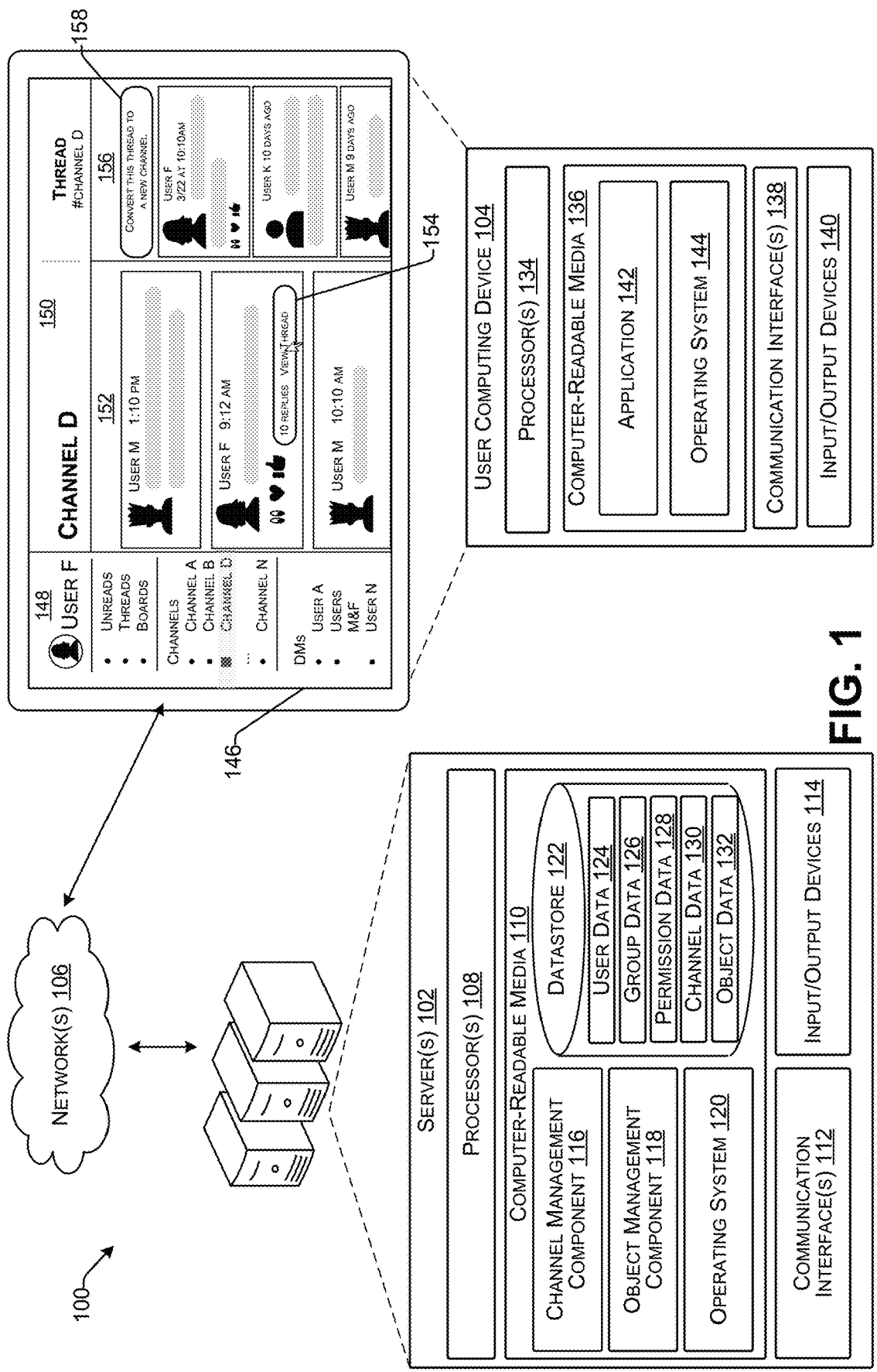
FIG. 1 illustrates an example environment for performing techniques described herein.

A communication platform can offer different types of virtual spaces for users of the communication platform to communicate between and among each other. In some examples, two or more users can communicate via a communication channel, which can be referred to herein as a "channel." In some examples, two or more users can communicate via a thread generated based on a message posted via a channel, such as to discuss a topic associated with the message. In some examples, members of the channel (e.g., users with permissions to view content associated with the channel) may view and/or contribute to the thread, such as by posting messages, reacting to messages, and the like. In at least one example, members of the channel who view and/or contribute to (e.g., share data in) the thread are referred to herein as members of the thread. In such an example, the members of the thread may include some or all of the members of the channel. As discussed above, in at least one example, members of a thread can share a significant amount of data over a long period of time, thereby causing the thread to become long and unwieldy and to lose organizational benefits of the thread. Techniques described herein are directed to enabling generation of a new channel based on a thread, thereby facilitating continued collaboration between users of the communication platform.

In at least one example, threads can be generated to enable users to have a conversation associated with a particular message (e.g., root message in a channel from which the thread is generated). By generating the thread for the conversation, the communication platform can improve data organization associated with the channel while also enabling members of channel to which the thread is relevant to view and/or contribute to the thread. In some examples, a conversation in a thread can be brief, in which members of the thread share a limited amount of data. In some examples, members of a thread may be actively engaged in a conversation of the thread, increasing an amount of data associated with the thread with each message posted therein. In some examples, the conversation in the thread may grow and change over time, thereby negating the organizational enhancement associated with the thread. In such examples, the thread can outgrow and/or expand beyond the benefits and/or functionalities associated therewith. In existing technologies, a user can generate a new channel and transfer data associated with the thread into the new channel. However, the user must individually select content associated with each message and manually transfer the data into the new channel. Additionally, the user must manually invite one or more other users to participate in the new channel, such as by individually inputting user identifiers associated with the other user(s) to invite the other user(s) to join the new channel.

Techniques described herein are directed to streamlined processes for associating thread data (e.g., content) of a thread with a channel. In some examples, the channel can include a new channel created based on the thread. In some examples, the channel can include an existing channel to which the thread data is associated. For instance, in at least one example, the communication platform can cause a presentation of a selectable option to enable a member of a thread to initiate a channel generation process. In some examples, in response to receiving an indication of selection of the selectable option (e.g., request to convert a thread to a new channel), the communication platform can automatically identify members of the thread and context data associated with the thread and can create a new channel including the members of the thread and the context data.

For the purpose of this discussion, "context data" can be data that is associated with the thread that is representative of previous communications between the users associated with the thread. In some examples, context data can include messages, files (e.g., documents, images, etc.), links, emojis, reactjis, calls, and/or the like that can be associated with the thread. In some examples, context data can be associated with a date stamp, time stamp, indication of a user who added a data item to the thread, or the like. In at least one example, the context data can comprise the conversational history associated with the thread.

In various examples, the new channel based on the thread can include characteristics that are the same or substantially the same as characteristics of the thread. The characteristics can include membership (e.g., associated users), context data (e.g., a number of messages, conversations, etc.), permissions (e.g., private, public, shared, etc.), features (e.g., title, name, topic, label, description, etc.), and the like. For instance, in at least one example, the new channel and the thread can include a membership and same context data (e.g., same number of messages, same conversations, etc.). In such an example, the characteristics of the new channel can be automatically determined based on the characteristics of the thread (e.g., default characteristics of the new channel). In some examples, in response to receiving a request to convert a thread to a new channel, the communication platform can generate a user interface to enable a user associated with the request (e.g., a requesting user) to input characteristics associated with the new channel. In such an example, the requesting user can interact with the user interface to modify the default characteristics (e.g., first characteristics) associated with the thread to second characteristics to be associated with the new channel. For example, the requesting user can designate additional or alternative users to be associated with the new channel, an amount of context data from the thread to include in the new channel, and/or permission settings associated with the new channel (e.g., private, public, shared, etc.).

Additionally or alternatively, the communication platform can be configured to provide a streamlined process for creating a new channel based on an object presented via a user interface of the communication platform. In some examples, the object can include a file (e.g., document, photograph, etc.), an event, a link (e.g., hyperlink, deep link, etc.), or the like. In some examples, the object can include a third-party object, such as that provided by a third-party resource and accessible via the communication platform. For example, the object can include a collaborative document that is accessible via a communication channel. For another example, the object can include an event associated with a calendar that is provided by a third-party service provider and accessible via the communication platform. In various examples, the communication platform can enable a user to create a new channel based on the object. Continuing the event example from above, the communication platform can cause a presentation of a selectable option to create a new channel based on the event associated with the calendar. In response to receiving a request to create the new channel (e.g., indication of selection of the selectable option), the communication platform can automatically identify one or more users associated with the event (e.g., attendees) and context data associated with the event (e.g., event description, files associated with the event, etc.) and can create a new channel, automatically associating the user(s) and the context data.

As described above, techniques described herein enable users to create new channels from threads and/or objects via a streamlined, efficient process that minimizes interaction required of the users. Techniques described herein therefore provide for a faster "conversion" process (i.e., "converting" a thread or object to a new communication channel). The expedited conversion process described herein reduces a total amount of computing resources required to create the new channel with data previously published or made available via the communication platform. As such, the expedited conversion process improves the functioning of a user computing device. Furthermore, in existing systems, a user generating a new thread based on a thread and/or object individually selects messages to be included in a new channel and sends the messages one-by-one, to the communication platform. At least because the techniques described herein can automatically identify the context data to be associated with the channel based on the thread and/or object, the techniques described herein can reduce a total amount of network traffic required to create a new channel based on a thread and/or object. As such, the techniques described herein can improve network bandwidth availability.

While techniques described above reference channel generation based on threads and/or objects, the same or similar techniques can apply to creating a channel based on a particular message and/or data that is associated with a direct messaging (DM) instance, a board, a huddle, or the like. That is, techniques described herein can streamline the generation of a new channel based on messages and/or other data that is accessible via the communication platform. Additional details and examples are described below with reference to FIGS. 1-10.

FIG. 1 illustrates an example environment 100 for performing techniques described herein. The example environment 100 can be associated with a communication platform that can leverage a network-based computing system to enable users of the communication platform to exchange data. In at least one example, the communication platform can be a channel-based communication platform, a message-based communication platform, and/or the like. In at least one example, the communication platform can be "group-based" such that the communication platform and associated systems, channels, DM communications, and/or other virtual spaces, messages, and/or the like have security (that can be defined by permissions) to limit access to defined groups of users. In some examples, such groups of users can be defined by identifiers, as described above, which can be associated with common access credentials, domains, or the like. In some examples, the communication platform can be a hub, offering secure and private virtual space(s) to enable users to chat, meet, call, collaborate, transfer files or other data, or otherwise communicate between or among each other.

In some examples, a group can be associated with an organization, which can be associated with an organization identifier. Users associated with the organization identifier can chat, meet, call, collaborate, transfer files or other data, or otherwise communicate between or among each other in a secure and private virtual space available via the communication platform. In some examples, users associated with a same organization can be associated with a same set of permissions, which can be associated with the organization. Users of different organizations can be associated with different permissions.

In some examples, a group can be associated with a workspace, associated with a workspace identifier. Users associated with the workspace identifier can chat, meet, call, collaborate, transfer files or other data, or otherwise communicate between or among each other in a secure and private virtual space available via the communication platform. In some examples, users associated with a same workspace can be associated with a same set of permissions, which can be associated with the workspace. In some examples, users associated with different workspaces, can be associated with different permissions.

In some examples, a group can be associated with multiple organizations and/or workspaces. In some examples, an organization can be associated with multiple workspaces.

In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., data, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (TOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., administrator, team leader, etc.) and/or types (e.g., verified, etc.).

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media 110 can optionally include a channel management component 116, an object management component 118, an operating system 120, and a datastore 122. The computer-readable media 110 can include additional or alternative functional components.

In at least one example, the channel management component 116 can manage channels. As described above, in at least one example, the communication platform can be a channel-based messaging platform, that in some examples, can be usable by group(s) of users. As described above, each group can be associated with a group identifier (e.g., organization identifier, workspace identifier) and one or more user accounts can be mapped to, or otherwise associated with, the group identifier. User(s) corresponding to such user account(s) can be "members" of the group.

In at least one example, users of the communication platform can communicate with other users via channels. A channel can be a virtual space and/or data route used for exchanging data between and among systems and devices associated with the communication platform. In at least one example, the channel management component 116 can establish a channel between and among various user computing devices, allowing the user computing devices to communicate and share data between and among each other. In at least one example, users who subscribe to updates associated with a channel and/or have permission to view, share, and/or interact with data associated with a channel can be referred to as "members" of the channel. In at least one example, the channel management component 116 can manage channel communications and/or sharing of data via channels.

In some examples, a channel may be "public," which may allow any user within a group (e.g., associated with an organization identifier, associated with a workspace identifier, etc.) to join and participate in the data sharing through the channel. In at least one example, any full member of a public channel can view and/or interact with context data associated with the public channel (e.g., history), add and/or remove members, and/or otherwise interact with the public channel. Public channels can be discoverable for users associated with a same group or who otherwise have permission to join. In some examples, a channel may be "private," which may restrict data communications in the channel to certain users or users having particular roles (e.g., managers, administrators, etc.) and/or types (e.g., verified, etc.). In some examples, private channels may not be discoverable by users who are not members of the private channels and users who are not members of the private channels may not be permitted to view or interact with data associated therewith. In at least one example, users who are members of a channel—private or public—can add or remove members, so long as such users have permission to do so (e.g., as defined by channel permissions and/or individual user permissions).

In some examples, a channel may be "shared," which may allow users associated with two or more different groups (e.g., entities associated with two or more different organization and/or workspace identifiers) to join and participate in the data sharing through the channel. Shared channels may be public such that they are accessible to any user of either group, or they may be private such that they are restricted to access by certain users or users having particular roles and/or types.

In various examples, the channel management component 116 can provide a means by which a user can generate a thread from a particular message associated with (e.g., posted in) a channel. In such examples, the channel management component 116 can enable the user to initiate a conversation associated with the particular message (e.g., root message) that may be relevant to a portion of the users associated with the channel. The thread may assist in maintaining data organization within the thread, such that conversations stemming from a root message may be contained within the thread and viewable at the discretion of a channel member. In various examples, members of the thread (e.g., users that contribute to and/or view contents of the thread) can post and/or view messages associated with the thread.

In at least one examples, the channel management component 116 can enable a member of a thread to initiate a conversion of the thread into a new channel. In some examples, the channel management component 116 can cause a presentation, in association with the thread, of a selectable option to initiate the conversion. In some examples, the selectable option can be presented in association with the thread at a time of thread generation. In such examples, the selectable option can be available to the members of the thread at any time during interaction with the thread. For example, the channel management component 116 can "pin" the selectable option to a header, footer, sidebar, or the like associated with the thread.

In some examples, the channel management component 116 can cause a presentation of the selectable option to initiate the conversion to be presented based on a determination that a number of messages and/or a period of time associated with the thread exceeds a threshold and can cause a presentation of the selectable option based a determination. A threshold number of messages and/or threshold time can include a pre-determined (e.g., default) number of messages and/or time, a number of messages and/or time determined based on user and/or organizational preferences (e.g., stored in user data 124 and/or group data 126). In at least one example, the selectable option to initiate the conversion can be presented in the thread via an automated message (e.g., bot message) generated and published in response to threshold exceedance. In some examples, the automated message can include an ephemeral message with a suggestion to convert the thread to a new channel. In such examples, the automated message can include the selectable option to initiate the conversion and a selectable option to ignore the suggestion to convert. In some examples, responsive to receiving an indication of selection of the selectable option to ignore the suggestion to convert the thread to the channel, the channel management component 116 may delete the automated message and/or remove the selectable option to initiate the conversion from a user interface associated with the thread.

In at least one example, the thread (or object) channel can be converted into a new channel. That is, in such an example, in response to receiving a request to convert the thread (or object), the server(s) 102 can create the new channel. In some examples, the channel can be an existing channel with which data associated with the thread (or object) is to be additionally associated. In such examples, the request to convert the thread (or object) can include an indication (e.g., identifier, identification, etc.) of the existing channel with which to associate thread data or object data.

In at least one example, converting a thread (or object) to a channel can include copying data associated with the thread (or object) to the channel. In such an example, the data may be accessible via the thread (or object) and the channel to which the thread (or object) is converted. In some examples, converting the thread (or object) to a channel can include transferring the data to the channel. In some examples, data transferred to a channel from a thread (or object) may not be accessible via the original channel via which the thread (or object) was generated and/or presented. In such examples, the thread (or object) may be disabled or frozen. In some examples, the server(s) 102 can provide an indicator, in association with the original channel, indicating that the data previously associated with the thread (or object) is available via a different channel. In some examples, the indicator can include a link to the different channel, such that, when selected by a user, the server(s) causes the different channel to be presented via a display.

In response to receiving an indication of selection of the selectable option to initiate the conversion of the thread to the channel, the channel management component 116 can create (e.g., generate) the new channel. In some examples, the channel management component 116 can automatically determine characteristics associated with the thread and can create the new channel based on the characteristics. The characteristics can include membership (e.g., associated users), context data (e.g., a number of messages, conversations, etc.), permissions (e.g., private, public, shared, etc.), features (e.g., title, name, topic, label, description, etc.), and the like. In at least one example, the channel management component 116 can identify members of the thread based on an identification of one or more users who have contributed to (e.g., posted messages, shared data, etc.) a thread and/or viewed content published in association therewith. In at least one example, the channel management component 116 can determine the permissions associated with the thread based on permissions associated with a channel associated therewith. For example, a channel that is public may include a thread that is public. For another example, a shared channel (e.g., accessible to users of two different organizations) may include a thread that is a shared thread, such that data posted in association with the thread is accessible to members of the shared channel, regardless of an associated organization.

In at least one example, the channel management component 116 can determine the context data based on data that is associated with the thread that is representative of previous communications between the users associated with the thread. In some examples, context data can include messages, files (e.g., documents, images, etc.), links, emojis, reactjis, calls, and/or the like that are associated with the thread. In some examples, context data can be associated with a date stamp, time stamp, indication of a user who added a data item to the thread, or the like. In at least one example, the context data can include the conversational history associated with the thread. In some examples, the context data can include one or more conversations associated with the conversational history of the thread. In such examples, the channel management component 116 can determine the individual conversations based on time periods (e.g., messages posted within a threshold time of one another, messages posted on a same day, same week, etc.), topics (e.g., keywords, etc.), participants (e.g., groups of users that contribute to a conversation, users tagged or mentioned (e.g., @mention) in a conversation, etc.), and the like.

In some examples, in response to receiving a request to convert a thread to a new channel (e.g., selection of the selectable option to initiate the conversion process) the channel management component 116 can create a user interface to enable a user associated with the request (e.g., a requesting user) to input characteristics associated with the new channel. In such an example, the channel management component 116 can enable the user to modify the characteristics associated with the thread (e.g., first characteristics) to second characteristics to be associated with the new channel. For example, the requesting user can designate additional or alternative users to be associated with the new channel, an amount of context data from the thread to include in the new channel, and/or permission settings associated with the new channel (e.g., private, public, shared, etc.). For another example, the requesting user can designate a title for the new channel. In various examples, the channel management component 116 can create the new channel based on the second (e.g., modified) characteristics.

As discussed above, the request can include one or more additional and/or alternative users to be associated with the channel. In some examples, the additional and/or alternative user(s) can be associated with a same group (e.g., organization) as the requesting user and/or a same group associated with the thread or a different group. For example, in some examples, one or more of the user(s) can be associated with a different group such that the new channel can be "externally" shared, regardless of whether the thread was associated with a shared channel. As described above, in at least one example, a first organization (or the host organization) can invite a second organization (or the invited organization) to join a channel. A resulting channel can be called a "shared channel" or an "externally shared channel." In some examples, an administrator or other user associated with the first organization can invite new members in the first organization or the second organization via a mention, a profile view, an email, or generating a link from a user interface associated with the channel that enables users to be added to the channel. In such examples, an administrator associated with a newly added user who is associated with a different organization may first approve participation of the newly added user with the new channel prior to access thereto by the newly added user.

In some examples, channels can be associated with features, some of which can be determined by permissions. Such permissions can indicate whether members can leave a channel, whether additional users can be added to a channel, whether users can be removed from a channel, whether guest users can be added to a channel, whether external users (e.g., associated with a different workspace, different organization, etc.) can join a channel, whether channels are discoverable, where channels are discoverable (e.g., in a people search, channel search, channel browser, linked within a message, etc.), whether a channel can be renamed and/or associated with a topic, purpose, or other details, and/or the like. In at least one example, the permissions can indicate that users who are associated with a channel (i.e., members) can access and/or otherwise interact with data associated with the channel and users who are not associated with a channel, may not access and/or otherwise interact with data associated with the channel. In some examples, a user can preview data associated with a channel, but may not be able to interact with such data if the user is not associated with the channel. As discussed above, the channel management component 116 can automatically determine the permissions based on permissions associated with the thread and/or root channel (e.g., channel from which the thread is created) or can determine the permissions based on input from the requesting user.

In at least one example, the channel management component 116 can create new channels based receiving an indication of selection of a selectable option to convert a thread into a new channel, described above. In some examples, the channel management component 116 can create new channels based at least in part on instructions received from the object management component 118.

In various examples, the object management component 118 can be configured to cause a presentation of one or more objects via a user interface of the communication platform. The object(s) can include a file (e.g., document, photograph, etc.), an event, a link (e.g., hyperlink, deep link, etc.), or the like. In some examples, the object can include a third-party object, such as that provided by a third-party resource and accessible via the communication platform. In such examples, the object management component 118 can access data associated with the object utilizing an application programming interface (API) associated with the third-party resource or other means for obtaining external data.

In some examples, the object management component 118 can cause the object(s) to be presented via a channel, such as to provide the members thereof to view and/or contribute to the object. In some examples, an object can be presented in a message feed of the channel. In such examples, the object can be presented as a message in the message feed. In some examples, the object can be presented as a thread or other sidebar associated with the message feed. In such examples, the object can be separated from the messages in the message feed, while still being presented in association with the channel. In various examples, the object management component 118 can configure the object(s) to enable members of the channel to comment on and/or otherwise edit the object(s). For example, a word processing document can be presented in a message feed associated with the channel. Members of the channel may contribute to the word processing document, such as by commenting on portions of the word processing document, highlighting sections, and the like.

In various examples, the object management component 118 can cause an object to be presented via the channel with a selectable option to initiate conversion of the object to a new channel, such as to increase collaboration functionalities associated therewith. In response to receiving an indication of selection of the selectable option, the object management component 118 can send an instruction to the channel management component 116 to create a new channel based on the object. In various examples, the object management component 118 can identify characteristics associated with the object and can cause the new channel to be created based on the characteristics. In such examples, the new channel may include characteristics that are the same or substantially the same as the object. For example, the object management component 118 can receive an indication of selection of a selectable option associated with a document presented via a channel and in association with a third-party application (e.g., collaborative document stored in association with a third-party service provider). The object management component 118 can determine characteristics associated with the document, such as context data (e.g., contents of the document, separate contributions and associated contributors, etc.), permissions (e.g. publicly available document, private document, etc.), a title of the document, a number and identification of contributors to the document (e.g., members of the object, users associated with the object, etc.), and the like. The object management component 118 can send instructions to the channel management component 116 to create a new channel based at least in part on the indication of selection of the selectable option and the characteristics associated with the document.

In some examples, in response to receiving an indication of selection of the selectable option, the object management component 118 can cause a user interface to be presented to enable a requesting user to input one or more characteristics to be associated with the new channel. In some examples, the user interface can enable the requesting user to modify one or more characteristics of the object and associate the modified characteristics with the new channel. In some examples, based on a particular type of object, certain characteristics of a channel may not be associated with the object. In such examples, the object management component 118 can identify the certain characteristics and can cause the user interface to be presented to the requesting user to enable input thereof. In some examples, based on the input from the requesting user, the object management component 118 can cause the channel generation component 116 to create the new channel.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user computing device 104. The datastore 122 can comprise one or more databases, which can include user data 124, group data 126, permission data 128, channel data 130, and object data 132. Additional or alternative data may be stored in the data store and/or one or more other data stores.

In at least one example, the user data 124 can store data associated with users of the communication platform. In at least one example, the user data 124 can store data in a user profile (which can also be referred to as a "user account"), which can store data associated with a user, including, but not limited to, one or more user identifiers associated with multiple, different organizations, groups, or entities with which the user is associated, one or more channel identifiers associated with channels to which the user has been granted access, one or more group identifiers for groups (or, organizations, teams, entities, or the like) with which the user is associated, an indication whether the user is an owner or manager of any channels, an indication whether the user has any channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the group data 126 can store data associated with individual groups, which as described above, can be organizations, workspaces, or the like. As described above, the communication platform can be partitioned into groups associated with groups of users. In at least one example, a group identifier can be associated with a group that is registered, or otherwise associated with the communication platform. In at least one example, the group identifier can indicate a physical address in the group data 126 where data related to the corresponding group is stored. In at least one example, data associated with group permissions can be stored in association with the group identifier, data identifying users associated with the group can be stored in association with the group identifier, data associated with messages and/or other data associated with the group can be stored in association with the group identifier, data associated with channels associated with the group can be stored in association with the group identifier, and the like. In some examples, such data can be mapped to, or otherwise associated with, other types of data in the datastore 122 (e.g., the user data 124, the permission data 128, the channel data 130, object 132, etc.).

In at least one example, the permission data 128 can store data associated with permissions associated with individual communication channels, threads, objects, and the like. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In at least one example, the permissions can include an indication of individual users authorized access to particular communication channels, threads, and/or objects, such as in private channels, private objects with limited access, and the like. In some examples, the permissions can include an indication of one or more groups (e.g., organizations) associated with the channel and/or object, such as group(s) of users that are granted access to the channel, thread, and/or object. In some examples, the permissions can include data associated with editing capabilities associated with particular users, such as whether the channel, thread, and/or object is view only or editable by individual users. In some examples, permissions associated with a channel and/or thread associated therewith can be mapped to, or otherwise associated with, data associated with the channel in the channel data 130. In some examples, permissions associated with an object can be mapped to, or otherwise associated with, data associated with the object in the object data 132. In some examples, permissions can indicate restrictions on individual channels, restrictions on user(s) associated with individual channels, and the like.

In some examples, the permissions data 128 can store permissions associated with individual users and/or groups of users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 124. In some examples, permissions can indicate which users can communicate directly with other users, which channels a user is permitted to access, restrictions on individual channels, which workspaces the user is permitted to access, restrictions on individual workspaces, and the like.

In some examples, permissions associated with a group can be mapped to, or otherwise associated with, an account or profile associated with group data 126. In some examples, permissions can indicate restrictions on individual groups, restrictions on channel(s) associated with individual groups, restrictions on DM(s) associated with individual groups, restrictions on objects associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In at least one example, the channel data 130 can store data associated with individual channels and/or threads associated therewith. In at least one example, the channel management component 116 can establish a channel between and among various user computing devices, allowing the user computing devices to communicate and share data between and among each other. In at least one example, a channel identification may be assigned to a channel, which indicates the physical address in the channel data 130 where data related to that channel is stored. In at least one example, such a channel identification can be associated with a data structure associated with the corresponding channel. In at least one example, a thread identification may be associated to the corresponding channel (e.g., channel from which the thread is generated). For example, the thread identification can include a channel identification and a time stamp associated with a message of the channel associated with the thread.

In at least one example, the object data 132 can store data associated with individual objects presented via a channel. In some examples, the object data 132 can include permissions associated with the individual objects. In at least one example, the object management component 118 can cause a presentation of an object via the channel, such as in a message of the channel, as an object accessed via the channel from a third-party resource, or the like. In such an example, the object management component 118 can enable one or more users with appropriate permissions to share data and communicate with one other via the object, such as by viewing and/or contributing to the object. In at least one example, an object identification may be assigned to an object presented via a channel, which indicates the physical address in the object data 132 where data related to that object is stored. In at least one example, such an object identification can be associated with a data structure associated with the corresponding object.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), channels, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored. In some examples, a database shard can store data related to two or more groups (e.g., as in a shared channel).

In some examples, a channel can be associated with a database shard within the datastore 122 that stores data related to a particular channel identification. For example, a database shard may store electronic communication data associated with the channel, which enables members of that particular channel to communicate and exchange data with other members of the same channel in real time or near-real time. In this example, a group or organization can be the owner of the database shard and can control where and how the related data is stored.

In some examples, a thread communication (e.g., message transmitted via a thread) can be associated with a database shard within the datastore 122 that stores data related to a particular thread identification and/or channel identification. For example, a database shard may store electronic communication data associated with the thread communication, which enables members associated with that thread to post data that can be accessible to other members associated with the same thread in real time or near-real time. In this example, a user, a group, and/or an organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 134, computer-readable media 136, one or more communication interfaces 138, and input/output devices 140.

In at least one example, each processor of the processor(s) 134 can be a single processing unit or multiple processing units, and can include single or multiple computing units or multiple processing cores. The processor(s) 134 can comprise any of the types of processors described above with reference to the processor(s) 108 and may be the same as or different than the processor(s) 108.

The computer-readable media 136 can comprise any of the types of computer-readable media 136 described above with reference to the computer-readable media 110 and may be the same as or different than the computer-readable media 110. Functional components stored in the computer-readable media can optionally include at least one application 142 and an operating system 144.

In at least one example, the application 142 can be a mobile application, a web application, or a desktop application, which can be provided by the communication platform or which can be an otherwise dedicated application. In some examples, individual user computing devices associated with the environment 100 can have an instance or versioned instance of the application 142, which can be downloaded from an application store, accessible via the Internet, or otherwise executable by the processor(s) 134 to perform operations as described herein. That is, the application 142 can be an access point, enabling the user computing device 104 to interact with the server(s) 102 to access and/or use communication services available via the communication platform. In at least one example, the application 142 can facilitate the exchange of data between and among various other user computing devices, for example via the server(s) 102. In at least one example, the application 142 can present user interfaces, as described herein. In at least one example, a user can interact with the user interfaces via touch input, keyboard input, mouse input, spoken input, or any other type of input. Techniques described herein as being performed by the application 142 can be performed and/or otherwise facilitated via other access points, such as web browsers or the like.

A non-limiting example of a user interface 146 is shown in FIG. 1. As illustrated in FIG. 1, the user interface 146 can present data associated with one or more channels, one or more threads associated with channels and, in some examples, one or more DM messages. Though not illustrated, the user interface 146 can additionally be configured to present data associated with one or more groups, workspaces, boards, huddles, and the like. In some examples, the user interface 146 can include a first region 148, or pane, that includes indicator(s) (e.g., user interface element(s) or object(s)) representing data associated with the group(s), channel(s), DM message(s), etc. with which the user (e.g., account of the user) is associated. Additional details associated with the first region 148 and indicator(s) are described below with reference to FIG. 2.

In at least one example, the user interface 146 can include a second region 150, or pane, that can be associated with a data feed (or, "feed") indicating messages posted to and/or actions taken with respect to one or more channels and/or other virtual spaces for facilitating communications (e.g., a virtual space associated with direct message communication(s), a virtual space associated with event(s) and/or action(s), etc.) as described herein. In at least one example, data associated with the second region 150 can be associated with the same or different workspaces. That is, in some examples, the second region 150 can present data associated with the same or different workspaces via an integrated feed. In some examples, the data can be organized and/or is sortable by workspace, time (e.g., when associated data is posted or an associated operation is otherwise performed), type (e.g., of action), channel, DM communication, user, or the like. In some examples, such data can be associated with an indication of which user (e.g., member of the channel) posted the message and/or performed an action. In examples where the second region 150 presents data associated with multiple workspaces, at least some data can be associated with an indication of which workspace the data is associated with. Additional details associated with the user interface 146, and the second region 150, are described below with reference to FIG. 2.

In FIG. 1, the second region 150 is associated with a message feed associated with a channel (e.g., Channel D). In at least one example, the message feed can indicate messages posted to and/or actions taken with respect to the channel, as described herein. In the illustrative example, the message feed is presented via a first messaging sub-region 152. In at least one example, the user interface 146 can include a first user interface element 154 that can be selectable such that, when selected or otherwise actuated, can cause the application 142 to present a thread associated with the corresponding message (e.g., message posted to Channel D by User F). In the illustrative example, the thread is presented via a second messaging sub-region 156 of the second region 150. In other examples, responsive to receiving an indication of selection of the first user interface element 154, the thread may be presented in the second region 150, such as in lieu of the channel (e.g., encompassing most or all of the second region 150).

In some examples, the thread can include a second user interface element 158 that can be selectable such that, when selected or otherwise actuated, can cause the application 142 to initiate a generation of a new channel based on the thread, as described above. As illustrated in FIG. 1, the second user interface element 158 can pinned or otherwise continually presented in association with the thread. In other examples, the second user interface element 158 can be presented in association with an automated message, such as an ephemeral message automatically created based on a determination that a number of messages in the thread and/or a time associated with the thread meets or exceeds a respective threshold.

In some examples, the application 142 can automatically cause the new channel to be created (via the channel management component 116), such as based on characteristics of the thread and/or channel. In some examples, the application 142 can cause window or other user interface element to be presented via the user interface 146, such as to enable the user to input one or more characteristics to be associated with the new channel. Additional details associated with the thread to channel conversion will be discussed below with regard to FIGS. 2A-B and 3. Additionally or alternatively, the application 142 can cause a new channel to be created based on an object presented in the second region 150, such as responsive to receiving an indication of selection of a second user interface element 158 associated with the object. In such examples, the application 142 can send an instruction to initiate a generation of a new channel to the object management component 118 and/or the channel management component 116. Additional details are described below with reference to FIG. 4.

In at least one example, the operating system 144 can manage the processor(s) 134, computer-readable media 136, hardware, software, etc. of the user computing device 104.

The communication interface(s) 138 can include one or more interfaces and hardware components for enabling communication with various other devices (e.g., the user computing device 104), such as over the network(s) 106 or directly. In some examples, the communication interface(s) 138 can facilitate communication via Websockets, APIs (e.g., using API calls), HTTPs, etc.

The user computing device 104 can further be equipped with various input/output devices 140 (e.g., I/O devices). Such I/O devices 140 can include a display, various user interface controls (e.g., buttons, joystick, keyboard, mouse, touch screen, etc.), audio speakers, connection ports and so forth.

While techniques described herein are described as being performed by the channel management component 116, the object management component 118, and the application 142, techniques described herein can be performed by any other component, or combination of components, which can be associated with the server(s) 102, the user computing device 104, or a combination thereof.

Figure 2A:
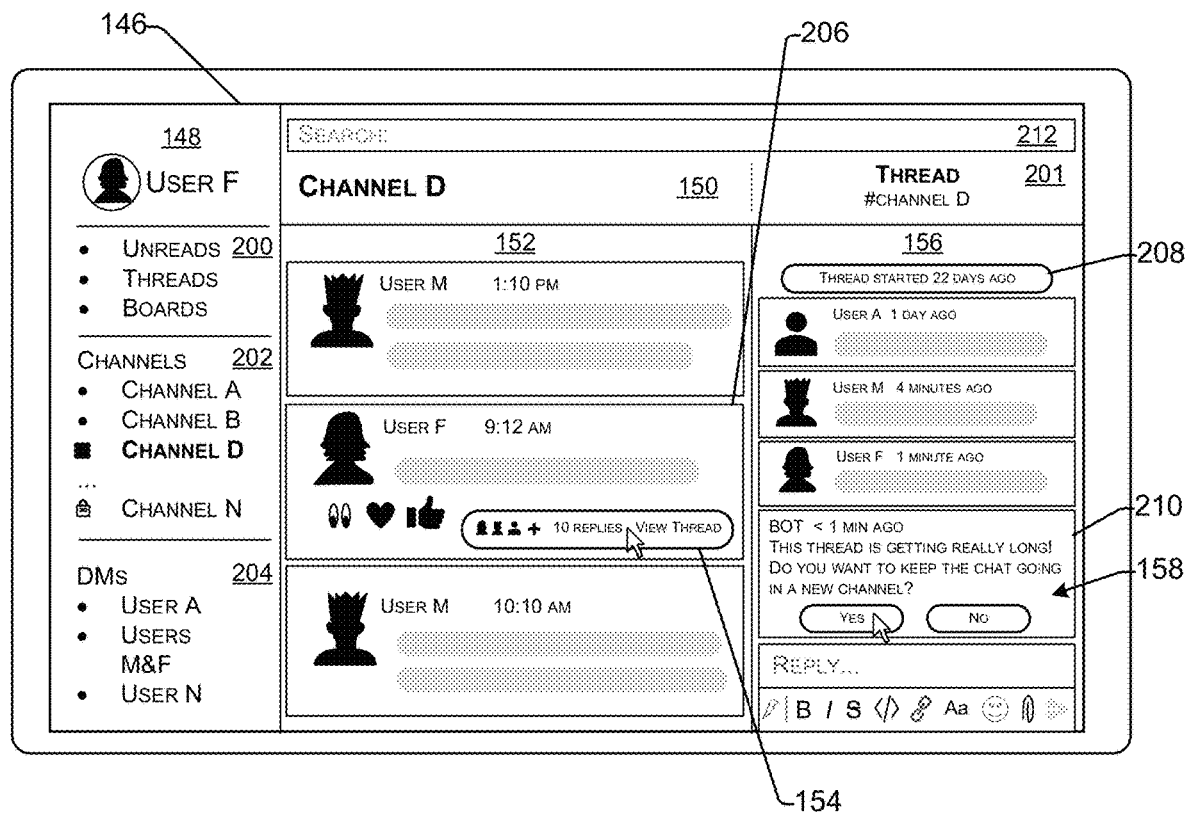
FIG. 2A illustrates an example user interface associated with creating a new channel based on a thread, as described herein.
Figure 2B:
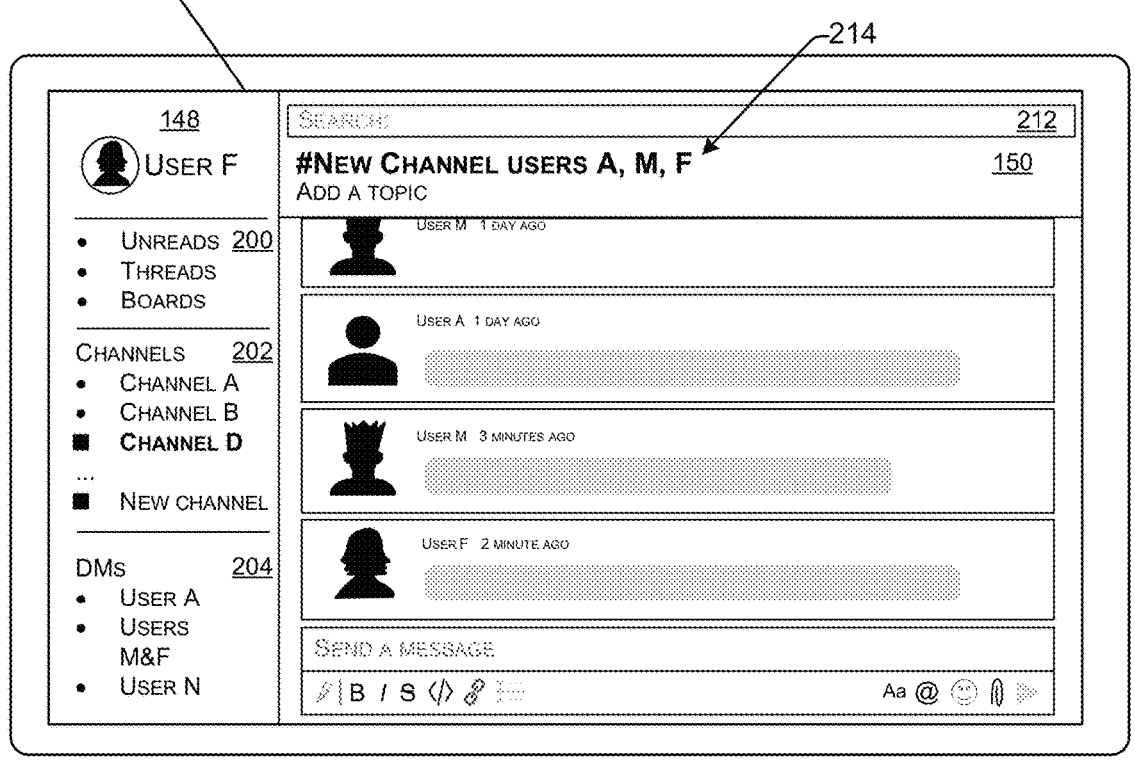
FIG. 2B illustrates another example of the user interface described in FIG. 2A wherein a new channel created based on the thread from FIG. 2A is presented, as described herein.

FIGS. 2A-2B illustrate additional details associated with the user interface 146 and creating a new channel based on a thread, as described herein.

As described above, in some examples, the user interface 146 can include a first region 148, or pane, that includes indicator(s) (e.g., user interface element(s) or object(s)) representing virtual space(s) associated with the workspace(s) with which the user (e.g., account of the user) is associated. In at least one example, the first region 148 can include one or more sub-regions, or sub-panes, which can represent different virtual spaces. For example, a first sub-region 200 can include indicators representing virtual spaces that can aggregate data associated with a plurality of channels, DM instances, and/or workspaces. In at least one example, each virtual space can be associated with an indicator in the first sub-region 200. In some examples, an indicator can be associated with an actuation mechanism such that when actuated, can cause the application 142 to present data associated with the corresponding virtual space via the second region 150. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second region 150, for example in a feed. In such examples, different types of events and/or actions, which can be associated with different channels and/or virtual spaces, can be presented via a same feed. In some examples, such data can be organized and/or is sortable by workspace, time, type, channel, user, or the like. In some examples, such data can be associated with an indication of which user (e.g., member of the channel) posted the message and/or performed an action. If at least one of the user or a group with which the user is associated are verified, the indication can be associated with an indicator indicating that the user and/or group is/are verified.

In some examples, each virtual space can be associated with a same type of event and/or action. For example, "threads" can be associated with messages, files, etc. posted in threads to messages posted in a channel, such as thread 201 illustrated in FIG. 2A. That is, in some examples, same types of events and/or actions, which can be associated with different channels and/or virtual spaces, can be presented via a same feed. As with the "unreads" virtual space, data associated with such virtual spaces can be organized and/or is sortable by workspace, time, type (e.g., of action), channel, user, or the like.

In at least one example, the first region 148 of the user interface 146 can include a second sub-region 202, or sub-pane, that includes indicators representing channels. In some examples, the channels can include public channels, private channels, shared channels (e.g., between workspaces or organizations), single workspace channels, cross-workspace channels, combinations of the foregoing, or the like. In some examples, the channels represented can be associated with a single workspace. In some examples, the channels represented can be associated with different workspaces (e.g., cross-workspace). In at least one example, if a channel is cross-workspace (e.g., associated with different workspaces), the user may be associated with both workspaces, or may only be associated with one of the workspaces. In some examples, the channels represented can be associated with combinations of channels associated with a single workspace and channels associated with different workspaces.

In some examples, the second sub-region 202 can depict all channels, or a subset of all channels, that the user has permission to access (e.g., as determined by the permission data 128). In such examples, the channels can be arranged alphabetically, based on most recent interaction, based on frequency of interactions, based on channel type (e.g., public, private, shared, cross-workspace, etc.), based on workspace, in user-designated sections, or the like. In some examples, the second sub-region 202 can depict all channels, or a subset of all channels, that the user is a member of, and the user can interact with the user interface 146 to browse or view other channels that the user is not a member of but are not currently displayed in the second sub-region 202. In some examples, different types of channels (e.g., public, private, shared, etc.) can be in different sections of the second sub-region 202, or can have their own sub-regions or sub-panes in the user interface 146. In at least one example, shared channels can be associated with their own sub-region or sub-pane within the first region 148. In some examples, channels associated with different workspaces can be in different sections of the second sub-region 202 or can have their own regions or panes in the user interface 146.

In some examples, the indicators can be associated with user interface elements that visually differentiate types of channels. For example, Channel D is associated with a square user interface element instead of a circle user interface element. As a non-limiting example, and for the purpose of this discussion, the square user interface element can indicate that the associated channel (e.g., Channel D) is an externally shared channel. In some examples, such a user interface element can be the same for all externally shared channels. In other examples, such a user interface element can be specific to the other group with which the externally shared channel is associated. In another example, a user interface element can indicate that a channel is private (e.g., Channel N). That is, the lock icon can indicate that the channel is not discoverable by other users and other users cannot access data associated with such a channel. In some examples, additional or alternative graphical elements can be used to differentiate between public channels, private channels, shared channels, channels associated with different workspaces, and the like. In other examples, channels that the user is not a current member of may not be displayed in the second sub-region 202 of the user interface 146. In such examples, the user may navigate to a different interface (not shown) to browse additional channels that are accessible to the user but to which the user is not currently a member.

In addition to the second sub-region 202, the first region 148 can include a third sub-region 204, or sub-pane, that can include indicators representative of communications with individual users or multiple specified users (e.g., instead of all, or a subset of, members of an organization). Such communications can be referred to as DM instances or communications. That is, the third sub-region 204, or sub-pane, can include indicators representative of virtual spaces that are associated with private messages between two or more users.

As described above, in at least one example, the user interface 146 can include a second region 150, or pane, that is associated with a feed indicating messages posted to and/or actions taken with respect to a channel and/or other virtual space (e.g., a virtual space associated with direct message communication(s), a virtual space associated with event(s) and/or action(s), etc.) for facilitating communications. As described above, in at least one example, data associated with the second region 150 is shown as a feed associated with a channel (e.g., Channel D). In some examples, the data in the feed can be organized and/or is sortable by date, time, type of action, user, or the like. In some examples, such data can be associated with an indication of which user posted the message and/or performed an action.

For purposes of this discussion, a "message" can refer to any electronically generated digital object provided by a user using the user computing device 104 and that is configured for display within a channel and/or other virtual space (e.g., a virtual space associated with direct message communication(s), etc.) for facilitating communications as described herein. A message may include any text, image, video, audio, or combination thereof provided by a user (using a user computing device). For instance, the user may provide a message that includes text, as well as an image and a video, within the message as message contents. In such an example, the text, image, and video would comprise the message. Each message sent or posted to a channel of the communication platform can include metadata comprising a sending user identifier, a message identifier, message contents, a group identifier, a channel identifier, or the like. In at least one example, each of the foregoing identifiers may comprise American Standard Code for Information Interchange (ASCII) text, a pointer, a memory address, or the like.

In some examples, a user can comment on a message in a "thread," such as thread 201. In various examples, a user can generate the thread by selecting a create thread selectable option (not illustrated) associated with a message, such as message 206 (e.g., message posted to Channel D by User F). After generation, one or more users who are members of the channel can view and/or post messages to the thread, such as by selection of the first user interface element 154 associated with the message 206. For example, a member of the channel may access the data associated with the thread 201 by selecting the first user interface element 154. Members of the channel may view and/or post messages via the thread 201. The messages and/or threads can be associated with file(s), emoji(s), reactji(s), app(s), etc. As discussed above, members of a channel who view and/or post messages via the thread may be considered members of the thread. As an illustrative example, at least users K, M, and F may be identified as members of the thread 201.

In various examples, in response to selection of the first user interface element 154, the thread 201 may be presented via a second messaging sub-region 156 associated with the second region 150. In some examples, responsive to selection of the first user interface element 154 and/or an indicator presented in the first sub-region 200, the thread 201 and/or data associated therewith may be presented in the second region 150. In such examples, the thread 201 and/or data associated therewith can encompass some or all of the second region 150.

As illustrated, the thread 201 can be presented with various information, such as an associated channel identification, a thread title, and/or messages posted in association with the thread 201. In some examples, the information associated with the thread 201 can include start indicator 208. The start indicator can provide an indication of a time and/or date in which the thread 201 was initiated. In some examples, the start indicator 208 can include a number of days in which the thread has been active. For example, the start indicator 208 illustrated in FIG. 2A indicates that the thread 201 was started 22 days ago.

In various examples, the thread 201 may include a second user interface element 158. In some examples, the second user interface element 158 can be associated with the thread 201 from an initiation or creation of the thread. In such examples, the second user interface element 158 can provide a means by which a member of the thread may convert the thread to a new channel at any time during interaction with the thread 201. In various examples, the second user interface element 158 may be pinned or otherwise continuously associated with the thread.

In some examples, the communication platform, such as via the channel generation component 116, can determine to cause a presentation of the second user interface element 158 in association with the thread 201. In some examples, the communication platform can determine to present the second user interface element 158 based on a determination that a number of messages in the thread 201 meets or exceeds a threshold number of messages. In some examples, the communication platform can determine to present the second user interface element 158 based on a determination that a period of time associated with the thread 201 exceeds a threshold period of time. In some examples, the period of time can include a time that the thread 201 is active (e.g., members posting messages to the thread 201, accessing data associated with the thread 201, etc.). In some examples, the communication platform can determine to present the second user interface element 158 based on a determination that a frequency of new messages being added to the thread exceeds a threshold frequency. In some examples, the communication platform can determine to present the second user interface element 158 based on a determination that the frequency exceeds the threshold frequency for a threshold period of time.

In response to determining that a threshold is met or exceeded (e.g., threshold number of messages, threshold time, threshold frequency of messages, threshold frequency of messages for a threshold time, etc.), the communication platform can cause the presentation of the second user interface element 158 in association with the thread 201. In some examples, the second user interface element 158 can be pinned to a location in the thread 201, such as to a top of the thread 201, a bottom of the thread 201, a sidebar of the thread 201, or the like. As illustrated in FIG. 2A, the second user interface element 158 can be presented as an automated message 210 posted in the thread 201. In some examples, the automated message 210 can include a message generated and posted by the communication platform (e.g., not by a user thereof), such as based on a determination that a threshold is met or exceeded, as described above.

In some examples, the automated message 210 can include an ephemeral message associated with the thread 201. In the illustrative example, the automated message 210 includes an explanation associated with the message and an inquiry as to whether the user may want to convert the thread 201 into a new channel. As discussed above, the second user interface element 158 can include an input mechanism to enable a user to convert the thread 201 into a new channel. In some examples, the second user interface element can include selectable options to accept or decline an offer to convert the thread 201 into a new channel. In response to receiving an indication of a declination of the offer (e.g., indication of selection of the "No" option), the communication platform can remove from view or mute the automated message 210 in the thread 201. In response to receiving an indication of an acceptance of the offer via the second user interface element (e.g., indication of selection of "Yes" option), the communication platform can create the new channel.

As discussed above, in response to receiving a request to convert the thread 201 to a new channel (e.g., an indication of an acceptance of the offer to create the new channel), the communication platform can automatically create the new channel based on characteristics associated with the thread 201 and/or the channel associated therewith (e.g., Channel D). The characteristics can include membership (e.g., associated users), context data (e.g., a number of messages, conversations, etc.), permissions (e.g., private, public, shared, etc.), features (e.g., title, name, topic, label, description, etc.), and the like. For example, based on a determination that Channel D is a shared channel, the communication platform may create the new channel as a shared channel. As will be discussed in greater detail below with regard to FIG. 3, in some examples, the communication platform may cause a presentation of a window or other user interface element to enable the user to input one or more characteristics to be associated with the new channel.

In some examples, and as illustrated in FIG. 2A, the second region 150 can comprise a feed associated with a channel. In such examples, data associated with the channel can be presented via the feed. In at least one example, data associated with a thread, such as thread 201, can be viewable to members of the channel responsive to selecting the first user interface element 154. In some examples, messages associated with the thread 201 can appear differently for different users (e.g., based on personal configurations, group membership, permissions, policies, etc.).

In at least one example, the user interface 146 can include a search mechanism 212, wherein a user can input a search term and the server(s) 102 can perform a search associated with the communication platform. In some examples, the search can be performed across each group with which the user is associated, or the search can be restricted to a particular group, based on a user specification. In some examples, the search can be performed relative to a channel, a thread, an object, a DM communication, and/or the like.

FIG. 2B illustrates an example of the user interface 146 after a thread has been converted to a new channel as described above in FIG. 2A.

As described above, the communication platform can create the new channel based on characteristics associated with the originating channel (e.g., Channel D) and/or the originating thread (e.g., thread 201). As will be discussed in greater detail below with regard to FIG. 3, in some examples, the new channel may be created based on characteristics input by a user requesting the generation of the new channel.

In FIG. 2B, a new channel has been created (e.g., #New Channel) and the new channel is represented by an indicator in the second sub-region 202. That is, the new channel can be associated with a region (e.g., second sub-region 202) of the user interface 146 where one or more channels are also represented, as described above. In at least one example, the second region 150 can be updated to include context data transferred from the original thread 201. As illustrated, the new channel comprises three members: User E, User M, and User F, which correspond to the same members as the thread 201. In other examples, additional or alternative users may be added to the new channel, such as input by the user requesting the generation of the new channel. Each of the members of the new channel can view context data associated with the new channel, interact with such context data and/or add new data, and/or otherwise communicate via the new channel as permitted by relevant permission(s).

As described above, while channels and threads each can provide virtual spaces for associated members to communicate, channels and threads can be associated with different features. That is, a channel can be associated with one or more first features which can be different than one or more second features associated with a thread. In at least one example, such features can be defined, at least in part, by permissions associated with each type of virtual space. In at least one example, a channel can be associated with one or more first permissions which can be different than one or more second permissions associated with a thread. For example, members may not be permitted to leave or unfollow threads, but may be permitted to leave channels.

In at least one example, the new channel can be created automatically, such as responsive to receiving a request to convert a thread into a channel via a second user interface element. In such an example, the channel can include the same or substantially the same characteristics as the thread and/or original channel associated with the thread. For example, Channel D associated with the thread 201 includes a square indicator, which, as described above, can indicate that Channel D is a shared channel. Similarly, the new channel can include a square indicator and can include a shared channel. As such, at least one of users A, M, and F can be associated with a different group or organization from the other users of the new channel.

In various examples, the new channel can include a label 214 indicating a title associated with the new channel. In some examples, the title can include a title associated with the thread and/or the originating channel associated with the thread 201. In some examples, the title can include a user defined title, such as one input by the user during or after channel generation. In the illustrative example, the label 214 includes an indication of channel membership, such as an indicator that users A, M, and F are members of the new channel. In other examples, the label 214 can include additional or alternative information, such as indicators associated with different organizations of members of the channel, avatars associated with members of the channel, a number of members of the channel, or the like.

As described above, the requesting user can designate a title for the label 214 and/or other characteristics associated with the new channel. In at least on example, the communication platform can cause an indicator associated with the new channel, such as that based on the title, to be presented via the first region 148 of the user interface 146, such as in the second sub-region 202. The indicator can include a selectable element that, when selected, causes the new channel and data associated therewith to be presented via the second region 150.

Figure 3:
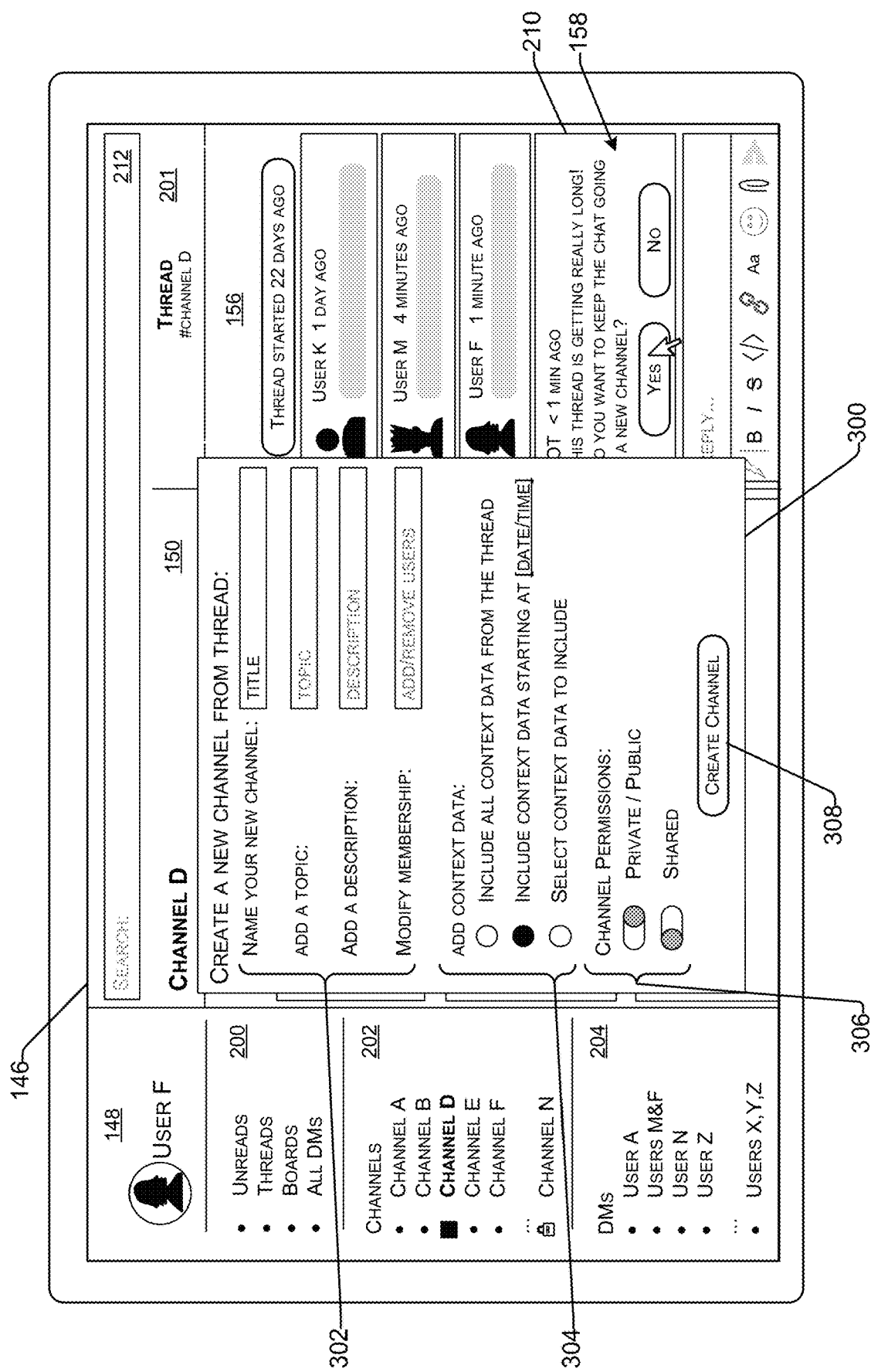
FIG. 3 illustrates another example of the user interface described in FIG. 2A associated with designating characteristics to associate with a new channel to be created based on the thread from FIG. 2A, as described herein.

FIG. 3 illustrates the user interface 146 described in FIG. 2A in which a third user interface element 300 is presented in response to receiving a request to create a new channel based on a thread 201, such as via the second user interface element 158. Though illustrated in association with the thread 201, this is not intended to be so limiting, and the third user interface element 300 can additionally or alternatively be presented in association with an object.

In various examples, the third user interface element 300 can enable the requesting user to modify and/or input one or more characteristics to be associated with the new channel. In some examples, a presentation of the third user interface element 300 can include a request, from the communication platform, to the requesting user, to specify characteristics to be associated with the new channel. For example, the third user interface element 300 can include a request to identify a subset of users of the thread (or an object) to associate with the new channel. For another example, the third user interface element 300 can include a request to identify messages or other data from the thread (or the object) to associate with the new channel. In the illustrative example, the third user interface element 300 is presented as a window associated with the channel presented in the second region 150. In other examples, the third user interface element 300 can be presented such that it encompasses all or a portion of the second region 150.

As illustrated in FIG. 3, the third user interface element 300 can include a feature section 302, a context data section 304, and/or a channel permissions section 306. The feature section 302 can enable the user to input one or more features associated with the new channel. In some examples, the input can include a modification to a default setting, such as that determined based on the thread 201 and/or the channel associated therewith (e.g., Channel D). In some examples, the input can include additional and/or alternate features. In the illustrative example, the features include a title, topic, description, and/or membership associated with the new channel. Though other features are contemplated herein.

As discussed above, responsive to receiving a request to convert a thread to a new channel, the communication platform can identify one or more users associated with the thread 201 (e.g., User K, User M, User F, etc.). In some examples, the communication platform can automatically determine membership of the new channel based on the identified one or more users of the thread. In other words, in some examples, the communication platform can automatically establish a default membership of the new channel to be the same as the membership of the thread. In at least one example, the third user interface element 300 can enable the requesting user to add or remove users to the new channel. In such an example, the requesting user may modify the membership of the thread. For example, a first group of users may be associated with the thread 201 such that the first group of users have viewed and/or contributed to the thread 201. The requesting user can determine a second group of users that is different from the first group of users (e.g., includes one or more additional users, does not include one or more users, etc.) and can input the addition and/or deletion of users via the features section. In some examples, the features section 302 can include a list of users associated with the thread, such as in association with the modify membership section. In such examples, the requesting user can delete one or more users from and/or add additional users to the list, such as for association with the new channel. In some examples, the requesting user can input a user identifier associated with the users to be modified (e.g., added or removed). In at least one example, the requesting user can input a symbol with the user identifier to indicate whether the other user is to be added or removed. For example, the requesting user can input "+UserZ" and "−UserM" to the features section 302 to add User Z and remove User M from the new channel.

In various examples, the communication platform can determine whether an additional user (e.g., user not previously associated with the thread or object) has permissions to view the context data associated with the new channel (e.g., permissions to view the thread or object). Based on a determination that the additional user does have permissions to view the context data, the communication platform can associate a user identifier associated with the user with the new channel. Based on a determination that the additional user does not have permissions to view the context data, the communication platform can provide an indication of a permissions error with respect to the additional user. In some examples, responsive to receiving the indication of the permissions error, the requesting user can modify permissions associated with the new channel, such as to enable the additional user access thereto. In some examples, responsive to receiving the indication of the permissions error, the requesting user can initiate an administrative process to grant the additional user access to the context data.

As discussed above, the communication platform can be configured to automatically select all context data associated with the thread 201 to be transferred or otherwise moved or stored in association with the new channel. In at least one example, the communication platform can enable the requesting user to modify the context data to be transferred to the new channel, such as via the context data section of the third user interface element 300. In some examples, the context data section 304 can include a first selectable option to include all context data from the thread. In response to receiving a selection of the first selectable option, the communication platform can transfer all data (e.g., messages, files, links, etc.) from the thread 201 into the new channel. In some examples, the context data section 304 can include a second selectable option to include context data starting at a particular date and/or time. In such examples, the requesting user can determine to transfer messages, files, links, and the like from the thread 201 that were transmitted and/or published at or after a designated time. In some examples, the context data section 304 can include a third selectable option to include selected context data from the thread 201. Responsive to receiving a selection of the third selectable option, the communication platform may cause a presentation of an additional user interface element illustrating data associated with the thread 201. The requesting user may then select particular messages, files, links, and the like for association with the new channel.

Though illustrated as including three options for transferring different amounts of data, this is merely an example and additional or alternative options may be provided. For example, the third user interface element 300 can include an option to select a particular conversation associated with the thread 201 to transfer to the new channel. In such an example, the communication platform may be configured to identify one or more conversations (e.g., nested conversations) within a thread 201, such as based on topics, keywords, time periods, or the like. The third user interface element 300 can thus provide an option for the requesting user to select one or more particular conversations for association with the new channel.

As discussed above, the communication platform can be configured to automatically determine permissions to associate with the new channel based on permissions of the thread 201 and/or the originating channel associated with the thread 201. For example, based on a determination that the originating channel (e.g., Channel D) is a shared channel that is a public channel (e.g., accessible to members of the associated organizations), the communication platform can automatically set the new channel to the default setting of a shared, public channel (as illustrated in the channel permissions section 306). In various examples, the third user interface element 300 can include the channel permissions section 306 to enable the requesting user to modify the default permissions. That is, the requesting user may input one or more permissions to be associated with the new channel. For example, the requesting user may modify, via the channel permissions section 306, the public channel setting to a private channel setting that is accessible to select users (e.g., Users K, M, F).

In various examples, the third user interface element 300 can include a create channel selectable option. Responsive to receiving an indication of selection of the create channel selectable option 308, the communication platform (e.g., the channel management component 116) can create the new channel based on the thread 201.

Figure 4:
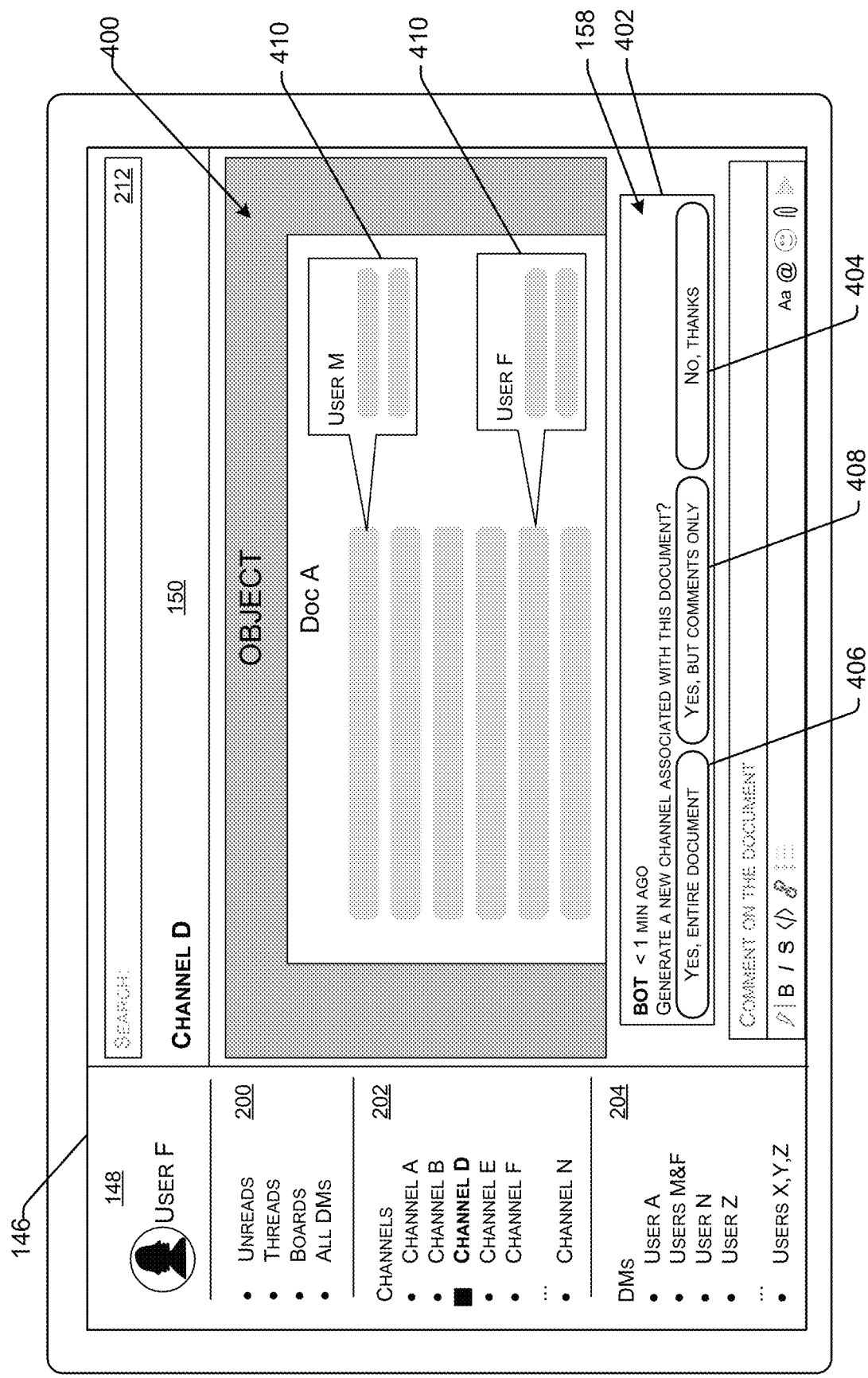
FIG. 4 illustrates an example user interface associated with creating a new channel based on an object.

FIG. 4 illustrates the user interface 146 described above with reference to FIG. 1, wherein the second user interface element 158 presented enables a user to create (e.g., generate) a new channel based on an object 400. As discussed above, the communication platform (e.g., via the object management component 118) can be configured to cause a presentation of an object 400 via the user interface 146. The object(s) can include a file (e.g., document, photograph, etc.), an event, a link (e.g., hyperlink, deep link, etc.), or the like. In the illustrative example, the object 400 includes a word processing document. However, this is not intended to be so limiting and the object 400 can include any other type of object that can be accessible via the user interface 146.

In some examples, the object 400 can include a third-party object, such as that provided by a third-party resource and accessible via the communication platform (e.g., in association with a third-party application). In such examples, the communication platform can access data associated with the object utilizing an application programming interface (API) associated with the third-party resource or other means for obtaining external data and can cause the presentation via the user interface 146. For example, an object could include a calendar object (e.g., event) associated with a calendar managed by a third-party service provider and accessible via the user interface 146.

In various examples, the object 400 is presented via a channel (e.g., Channel D), such as to provide members thereof to view and/or contribute to the object. In the illustrative example, the object 400 is presented in a message feed of the channel. In some examples, the object 400 can be presented as a message in the message feed. In some examples, the object 400 can be presented as a window, thread, or other sidebar associated with the message feed. In such examples, the object can be separated from the messages in the message feed, while still being presented in association with the channel. Though illustrated and described as being presented in association with the channel, this is not intended to be so limiting, and the object 400 can be presented in association with a workspace, a board, a huddle, or any other collaboration resource associated with the communication platform.

In various examples, the communication platform can configure the object 400 with permissions to enable members of the channel (or workspace, board, huddle, etc.) to comment and/or otherwise edit the object 400. For example, based on the permissions, the communication platform can enable channel members to edit text in the object 400, add text to the object 400, comment on the object 400, highlight portions of the object, and/or the like. In various examples, the permissions can be associated with individual users of the channel (or workspace, board, huddle, etc.). For example, one or more first users of a channel can have permission to view the contents associated with the object 400 and one or more second users of the channel can have permissions to comment on the object 400.

In some examples, the communication platform can cause the object 400 to be presented via the user interface 146 with a second user interface element 158 that can be selectable such that, when selected or otherwise actuated, can cause the application 142 to initiate a generation of a new channel based on the object, as described above. In the illustrative example, the second user interface element 158 is presented as a message 402 in association with the object 400. In other examples, the second user interface element 158 can be pinned or otherwise continually presented in association with the object.

In some examples, the second user interface element 158 can include a first selectable option 404 to decline a suggested action of creating the new channel based on the object 400. In some examples, responsive to receiving an indication of selection of the first selectable option 404, the communication platform can determine that a new channel is not to be created at the time associated with the selection. In some examples, the communication platform can cause the message 402 to be removed from view or muted within the channel and/or within the user interface 146.

In some examples, the second user interface element 158 can include a second selectable option 406 to enable a requesting user to accept the suggested action of creating the new channel based on the object 400. In some examples, the second selectable option 406 can include an option to create the new channel based on the entire object 400 (e.g., text, images, comments, highlighting, etc.). In such examples, all or substantially all of the data associated with the object 400 can be automatically associated with the new channel. In some examples, new channel generation based on the entire object 400 can be a default setting associated with new channel generation based on objects. That is, the communication platform can be configured to default to automatically creating the new channel based on an entire object and/or the data associated therewith.

Additionally, in some examples, the second user interface element 158 can include a third selectable option 408 to enable the requesting user to accept the suggested action of creating the new channel based on the object 400, but with limited data (e.g., less than all of the data associated with the object). In the illustrative example, the third selectable option 408 enables the requesting user to create a new channel based on comments 410 associated with the object 400. In other examples, the third selectable option 408 can enable the requesting user to create a new channel based on other data associated with the object 400, such as highlighted sections, edited sections (e.g., sections including changes, highlights, comments, etc.), and the like.

In various examples, the communication platform can be configured to automatically determine the characteristics to be associated with the new channel based on the corresponding characteristics of the object 400. In such examples, the new channel can be configured with characteristics that match or substantially match the corresponding object 400. In at least one example, the communication platform can determine membership associated with the object 400 based on an identification of one or more users who have viewed and/or edited the object 400. For example, the communication platform can determine that User M and User F are members of the object based on a determination that they have commented on the object 400. Accordingly, the communication platform can be configured to automatically associate Users M and F with the new channel.

In addition to the membership, in at least one example, the communication platform can determine one or more other features (e.g., title, name, topic, description, etc.) to associate with the new channel. In some examples, the communication platform can be configured to automatically determine the feature(s) based on the object. For example, the communication platform can determine a title, topic, and/or description associated with the object 400 and can set the title, topic, and/or description of the new channel to substantially match those of the object 400. For another example, the communication platform can be configured to determine a topic and/or description associated with the object 400, such as based on the context data associated therewith. The communication platform can be configured to analyze the context data associated with the object 400 to determine the topic and/or the description, such as by utilizing a text analysis tool, machine learning techniques, or the like.

In some examples, the communication platform can be configured to automatically determine permissions to associate with the new channel based on permissions associated with the object 400. In some examples, the communication platform can determine the permissions of the object 400 based on permissions of an associated channel, workspace, huddle, board, or the like. In examples in which the object 400 is a third-party object (e.g., managed and/or stored in association with a third-party resource), the communication platform determines permissions based on permissions data provided by the third-party resource. For example, the object can include a collaborative word processing document that is stored in association with a third-party resource and accessible to users via the user interface 146. The communication platform can receive the data associated with the object 400 utilizing an API or other interface, the data including object data of the object and permissions data associated with the object. Based on the permissions data, the communication platform can automatically determine permissions to associated with the new channel.

In various examples, responsive to receiving an indication of selection of at least one of the second selectable option 406 or the third selectable option 408, the communication platform can cause a third user interface element, such as third user interface element 300, to be presented via the user interface 146. In such examples, the communication platform can enable the user to modify and/or input one or more characteristics to be associated with the new channel. For example, the third user interface element can enable the user to input one or more features (e.g., title, topic, description, membership, etc.), selected context data, and/or permissions to associate with the new channel.

In response to receiving an indication of selection of at least one of the second selectable option 406 or the third selectable option 408 and/or one or more inputs associated with modified characteristics to be associated with new channel, the communication platform can determine characteristics to associate with the new channel (e.g., default and/or modified characteristics) that is based on the object 400 and can create the new channel with the characteristics. As discussed above, the characteristics of the channel can be the same or different from the characteristics associated with the object.

In at least on example, the communication platform can cause an indicator associated with the new channel to be presented via the first region 148 of the user interface 146, such as in the second sub-region 202. The indicator can include a selectable element that, when selected, causes the new channel and data associated therewith to be presented via the second region 150.

The user interface 146 described above with reference to FIGS. 1-4 is a non-limiting example of a user interface that can be presented via the user computing device 104 (e.g., by the application 142). In some examples, the application 142 can receive data from the channel management component 116 and/or object management component 118 and the application 142 can generate and present the user interface 146 based on the data. In other examples, the application 142 can receive data and/or instructions for generating the user interface 146 from the channel management component 116 and/or object management component 118. In such an example, the application 142 can present the user interface 146 based on the instructions. Additional or alternative data can be presented via a user interface and additional or alternative configurations can be imagined.

FIGS. 5-10 are flowcharts showing example processes involving techniques as described herein. The processes illustrated in FIGS. 5-10 are described with reference to components described above with reference to the environment 100 shown in FIG. 1 for convenience and ease of understanding. However, the processes illustrated in FIGS. 5-10 are not limited to being performed using the components described above with reference to the environment 100. Moreover, the components described above with reference to the environment 100 are not limited to performing the processes illustrated in FIGS. 5-10.

The processes in FIGS. 5-10 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 4-7 can be combined in whole or in part with each other or with other processes.

Figure 5:
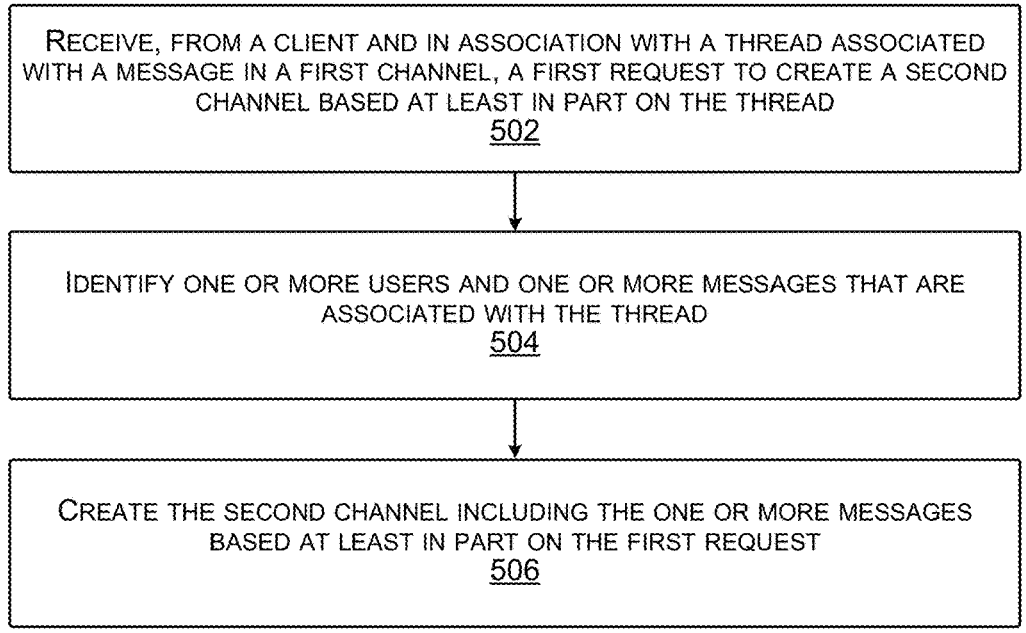
FIG. 5 illustrates an example process for creating a new channel based on a thread, as described herein.

FIG. 5 illustrates an example process 500 for creating a new channel based on a thread, as described herein.

At operation 502, the communication platform receives, from a client and in association with a thread associated with a message in a first channel, a first request to create a second channel based at least in part on the thread. The client can be associated with a user computing device 104. In various examples, the communication platform can receive the first request via a second user interface element 158.

At operation 504, the communication platform identifies one or more users and one or more messages that are associated with the thread. As discussed above, the communication platform identifies the user(s) based on thread membership. The thread membership can be determined based on an identification of one or more users who view and/or contribute to a thread (e.g., post a message in a thread, react to a message in the thread, etc.). In some examples, the thread membership can additionally be determined based on an indication that a user "follows" a thread, such that the user receives notifications or other indications of activity within the thread. In such examples, the communication platform can identify the user(s) based on user identifiers associated with viewers, contributors, and/or requests to follow the thread.

In some examples, the message(s) that are associated with the thread can include communications and/or data associated therewith that are shared via the thread. The message(s) (e.g., communications, data, etc.) can be context data associated with the thread. In various examples, the communication platform can identify the message(s) that are associated with the thread based on thread identifiers associated with the message(s). In such examples, the thread identifiers, which may be associated with a first channel identifier of the first channel, may indicate an association of the message(s) with the thread.

At operation 506, the communication platform creates the second channel including the message(s) based at least in part on the first request. In various examples, the communication platform automatically creates the second channel based on the request. In such examples, the communication channel creates the second channel based on characteristics (e.g., users, features, context data, permissions, etc.) associated with the thread and/or the first channel. In various examples, the communication platform can transfer the message(s) associated with the thread to the second channel. In such examples, the message(s) can be stored and presented in association with the second channel.

In some examples, the communication platform can receive an input corresponding to one or more characteristics to be associated with the second channel. In such examples, the characteristic(s) can include characteristics of the thread that are modified based on the input. For example, the requesting user can designate a portion of the message(s) to associate with the second channel. In such examples, the communication platform can transfer the portion of the message(s) to the second channel based on the input.

As illustrated in FIGS. 2A and 2B above, after the new channel is created, the communication platform (e.g., channel management component 116) can cause an indicator associated with the new channel to be presented via the second sub-region 202. In at least one example, if the user selects, or otherwise actuates, the indicator associated with the new channel, at least a portion of the context data can be presented via the second region 150 of the user interface 146. That is, based at least in part on detecting an input indication a selection, or other actuation, the indicator associated with the new channel, the communication platform can cause at least a portion of the context data to be presented via the second region 150 of the user interface 146, as a feed, for example.

Figure 6:
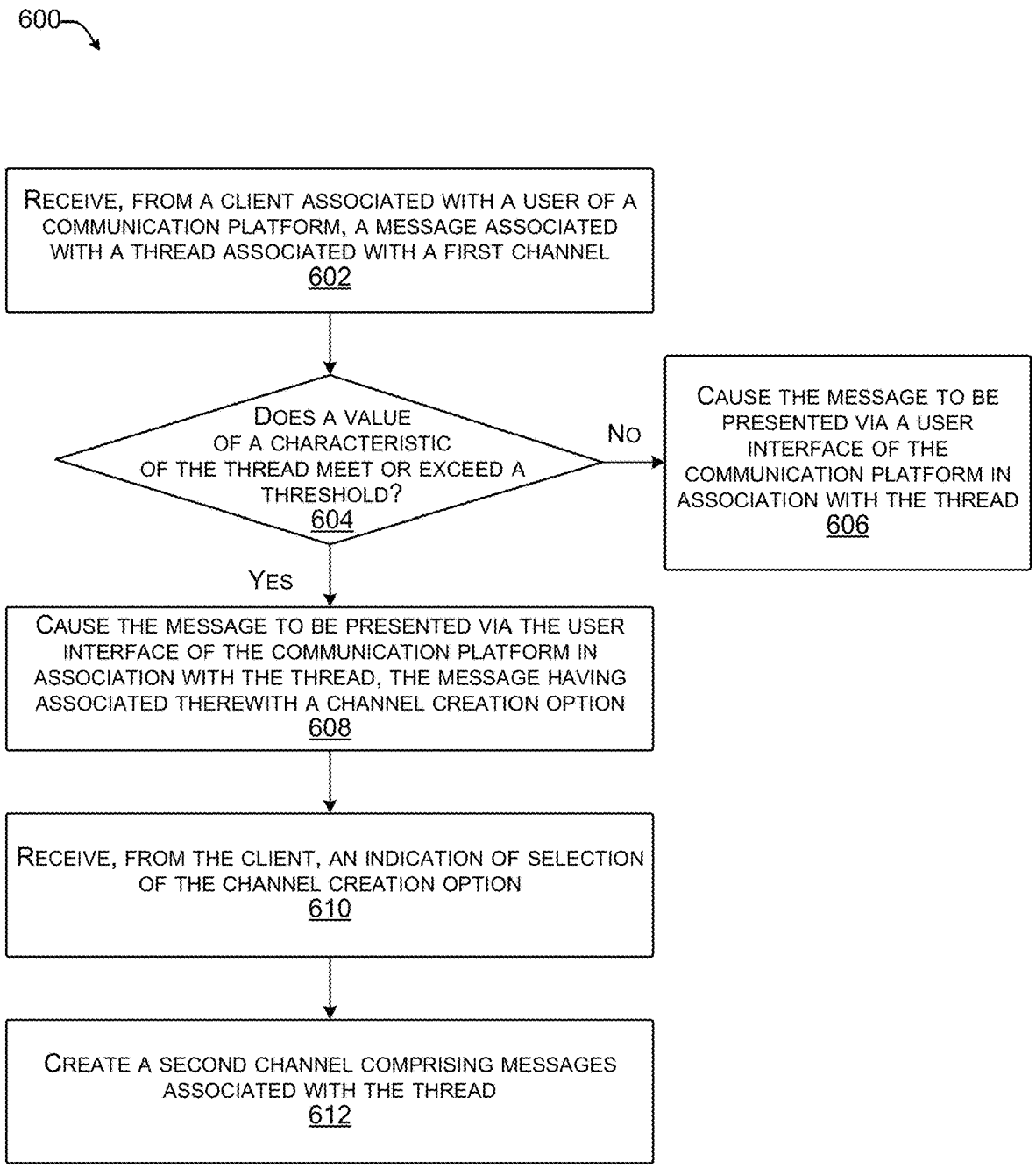
FIG. 6 illustrates an example process for suggesting a generation of a new channel based on thread characteristics of a thread, as described herein.

FIG. 6 illustrates an example process 600 for suggesting a generation of a new channel based on thread characteristics of a thread, as described herein.

At operation 602, the communication platform receives, from a client associated with a user of the communication platform, a message associated with a thread associated with a first channel. The client can be associated with a user computing device 104. In some examples, the message can have associated therewith a thread identifier, such as one that corresponds to the first channel. In such examples, the communication platform can identify an association between the message and the thread based at least in part on the thread identifier. The communication platform can be configured to receive the message and, based on the association with the thread, cause the message to be presented via one or more other clients associated with the communication platform, the one or more other clients having associated permissions that enable users associated therewith to view and/or contribute to the thread.

At operation 604, the communication platform determines whether a value of a characteristic of the thread meets or exceeds a threshold value. As discussed above, the characteristic can include membership, context data, features, permissions, and the like. In some examples, the value of the characteristic of the thread can include a number of messages (e.g., context data) associated therewith, a frequency of the messages posted in association with the thread, a frequency of messages posted for a threshold amount of time, a time associated with the messages (e.g., time associated with active messaging via the thread, time from initiation of the thread to a current time, etc.), and the like. The threshold value(s) can include a pre-determined (e.g., default) value set by the communication platform and/or can be determined based on user and/or organizational preferences associated with the communication platform, such as those stored in user data 124 and/or group data 126).

Based on a determination that the value of the characteristic does not meet or exceed the threshold value ("No" at operation 604), the communication platform, at operation 606, causes the message to be presented via a user interface, such as user interface 146 of the communication platform in association with the thread.

Based on a determination that the value of the characteristic meets or exceeds the threshold value ("Yes" at operation 604), the communication platform, at operation 608, causes the message to be presented via a user interface, such as user interface 146 of the communication platform in association with the thread, the message having associated therewith a channel creation option (e.g., second user interface element 158). In some examples, the channel creation option can be pinned or otherwise fixed in a location on the user interface 146 presented via the client. In some examples, the channel creation option can be presented in an automated message. In such examples, the communication platform can automatically generate the automated message including the channel creation option based on the determination that the value of the characteristic meets or exceeds the threshold value. In some examples, the automated message can include an ephemeral message. In some examples, responsive to determining that no selection of the channel creation option is received and/or an indication that an indication that the suggestion to create a new channel based on the object has been declined, the communication platform can delete, mute, or otherwise remove the channel creation option from the user interface 146.

At operation 610, the communication platform receives, from the client, an indication of selection of the channel creation option. In some examples, the communication platform determines, based on the indication of selection of the channel creation option, that the associated user submitted a request to create a new channel based on the thread. In some examples, in response to receiving the indication of selection of the channel creation option, the communication platform can identify the characteristics (e.g., users, features, context data, permissions, etc.) associated with the thread and/or the first channel.

At operation 612, the communication platform creates a second channel comprising messages associated with the thread. In various examples, the communication platform automatically creates the second channel based on the indication of selection of the channel creation option. In such examples, the communication channel creates the second channel based on the characteristics associated with the thread and/or the first channel. In various examples, the communication platform can transfer the message(s) associated with the thread to the second channel. In such examples, the message(s) can be stored and presented in association with the second channel.

In some examples, the communication platform can receive an input corresponding to one or more characteristics to be associated with the second channel. In such examples, the characteristic(s) can include characteristics of the thread that are modified based on the input. For example, the requesting user can designate a portion of the message(s) to associate with the second channel. In such examples, the communication platform can transfer the portion of the message(s) to the second channel based on the input.

As illustrated in FIGS. 2A and 2B above, after the new channel is created, the communication platform (e.g., channel management component 116) can cause an indicator associated with the new channel to be presented via the second sub-region 202. In at least one example, if the user selects, or otherwise actuates, the indicator associated with the new channel, at least a portion of the context data can be presented via the second region 150 of the user interface 146. That is, based at least in part on detecting an input indication a selection, or other actuation, the indicator associated with the new channel, the communication platform can cause at least a portion of the context data to be presented via the second region 150 of the user interface 146, as a feed, for example.

Figure 7:
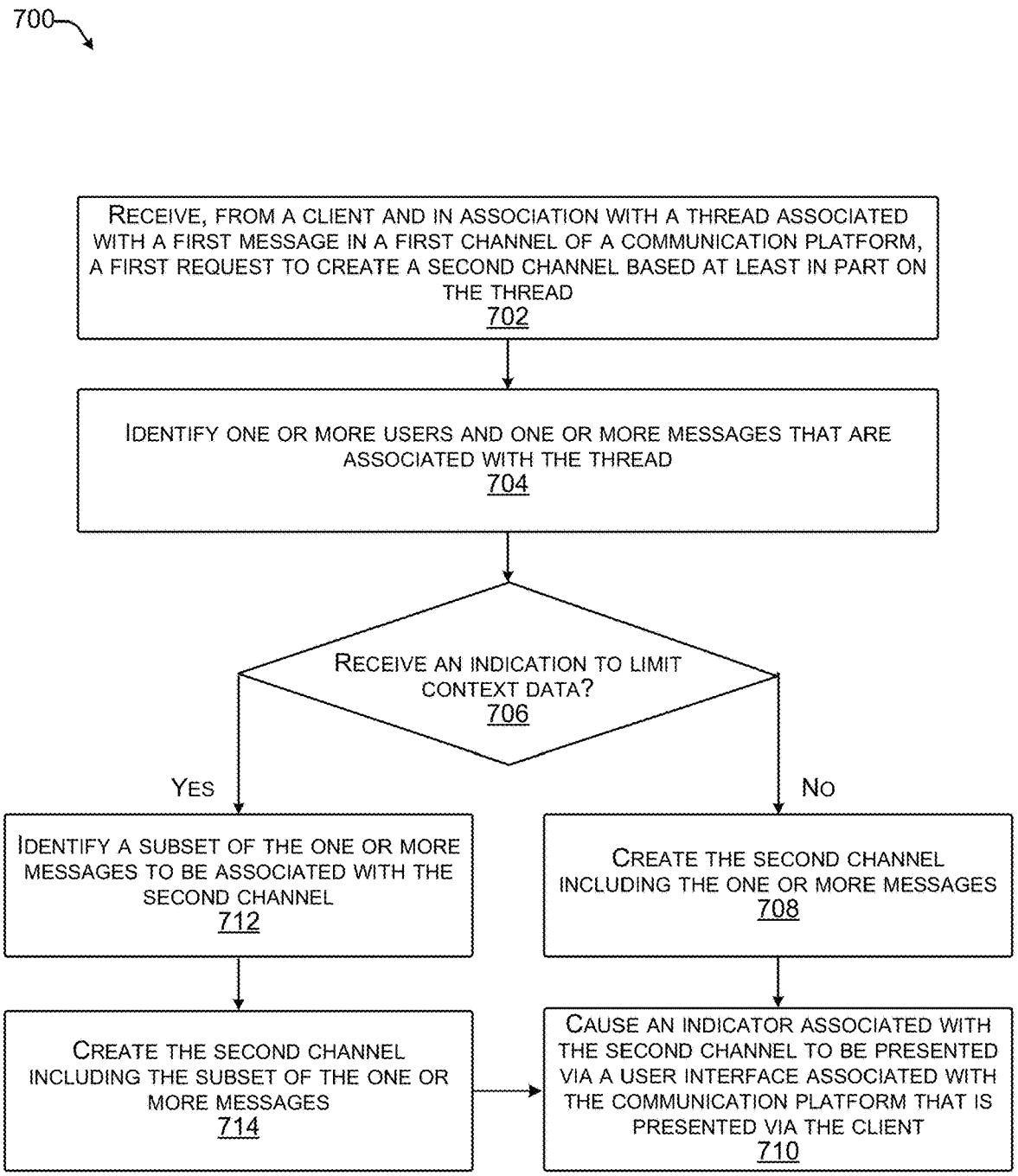
FIG. 7 illustrates an example process for determining context data to associate with a new channel created based on a thread, as described herein.

FIG. 7 illustrates an example process 700 for determining context data to associate with a new channel created based on a thread, as described herein.

At operation 702, the communication platform receives, from a client an in association with a thread associated with a first message in a first channel of a communication platform, a first request to create a second channel based at least in part on the thread. The client can be associated with a user computing device 104. In various examples, the communication platform can receive the first request via a second user interface element 158.

At operation 704, the communication platform identifies one or more users and one or more messages that are associated with the thread. As discussed above, the communication platform identifies the user(s) based on thread membership. The thread membership can be determined based on an identification of one or more users who view and/or contribute to a thread (e.g., post a message in a thread, react to a message in the thread, etc.). In some examples, the thread membership can additionally be determined based on an indication that a user "follows" a thread, such that the user receives notifications or other indications of activity within the thread. In such examples, the communication platform can identify the user(s) based on user identifiers associated with viewers, contributors, and/or requests to follow the thread.

In some examples, the message(s) that are associated with the thread can include communications and/or data associated therewith that are shared via the thread. The message(s) (e.g., communications, data, etc.) can be context data associated with the thread. In various examples, the communication platform can identify the message(s) that are associated with the thread based on thread identifiers associated with the message(s). In such examples, the thread identifiers, which may be associated with a first channel identifier of the first channel, may indicate an association of the message(s) with the thread.

At operation 706, the communication platform determines whether an indication to limit context data has been received from the client. In some examples, in response to receiving the first request, the communication platform can cause a third user interface element 300 to be presented via the client, the third user interface element 300 enabling the requesting user to determine an amount of data of the thread to be associated with the second channel. In some examples, data of the thread can be limited to a particular number of messages (and data associated therewith) (e.g., last 100 messages, etc.), messages associated with a particular conversation (e.g., nested conversation) in the thread, messages associated with a date and/or time range, or the like. In some examples, the communication platform may receive an indication of selection of one or more particular messages of the thread to associate with the second channel.

Based on a determination that the indication to limit the context data has not been received ("No" at operation 706), the communication platform, at operation 708 creates the second channel including the one or more messages identified at operation 704. In various examples, the communication platform can be configured to automatically transfer the one or more messages associated with the thread to the second channel. In such examples, the message(s) can be presented and/or stored in association with the second channel. In various examples, the communication platform can create the second channel based on additional characteristics (e.g., membership, permissions, features, etc.) associated with the thread and/or the first channel. In some examples, the communication platform can create the second channel based on input received via the third user interface element 300, such as one or more modifications to one or more of the characteristics of the thread and/or the first channel.

At operation 710, in response to creating the second channel, the communication platform can cause an indicator associated with the second channel to be presented via a user interface associated with the communication platform that is presented via the client. As illustrated in FIGS. 2A and 2B above, the communication platform (e.g., channel management component 116) can cause the indicator associated with the new channel to be presented via the second sub-region 202. In at least one example, if the user selects, or otherwise actuates, the indicator associated with the new channel, at least a portion of the context data can be presented via the second region 150 of the user interface 146. That is, based at least in part on detecting an input indication a selection, or other actuation, the indicator associated with the new channel, the communication platform can cause at least a portion of the context data to be presented via the second region 150 of the user interface 146, as a feed, for example.

Based on a determination that the indication to limit the context data has received ("Yes" at operation 706), the communication platform, at operation 712, identifies a subset of the one or more messages to be associated with the second channel. In various examples, the subset of the message(s) to be associate with the second channel can be determined based on user input received via the third user interface element 300. For example, the subset of the message(s) can be identified based on receiving an input of one or more particular messages to transfer to the second channel, a particular number of messages to transfer to the channel (e.g., last 50 messages, etc.), messages associated with a particular conversation (e.g., nested conversation) in the thread, messages associated with a date and/or time range, or the like.

At operation 714, the communication platform creates the second channel including the subset of the one or more messages. In some examples, the communication platform transfers the subset of the message(s) to the second channel. In such examples, the subset of the message(s) can be accessible and stored in association with the second channel. In various examples, the communication platform can create the second channel based on additional characteristics (e.g., membership, permissions, features, etc.) associated with the thread and/or the first channel. In some examples, the communication platform can create the second channel based on additional input received via the third user interface element 300, such as modifications to one or more of the characteristics of the thread and/or the first channel.

After the second channel is created, the communication platform can cause an indicator associated with the second channel to be presented via a user interface associated with the communication platform that is presented via the client, as described above with respect to operation 710.

Figure 8:
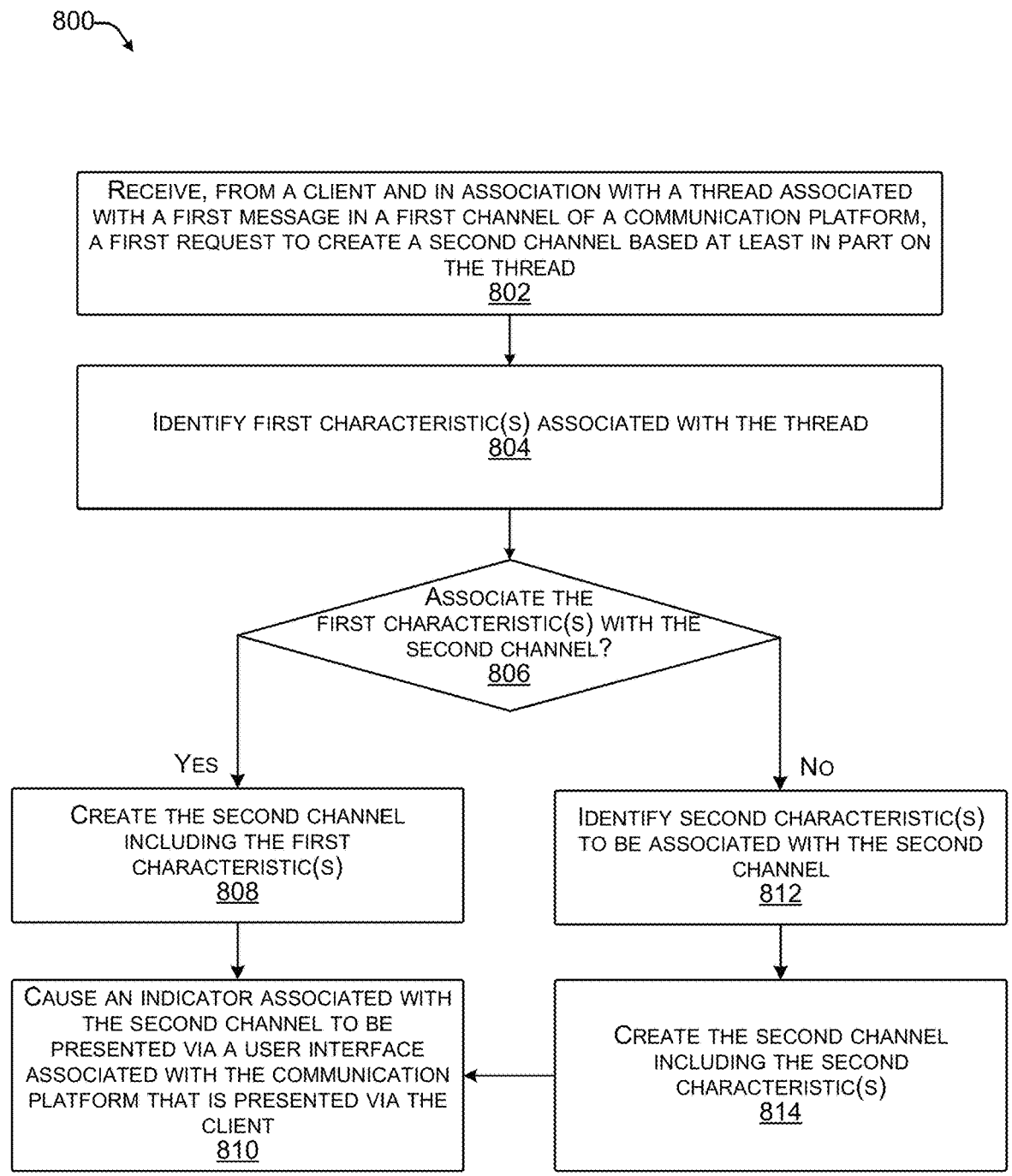
FIG. 8 illustrates an example process for determining characteristics to associate with a new channel created based on a thread, as described herein.

FIG. 8 illustrates an example process 800 for determining characteristics to associate with a new channel created based on a thread, as described herein.

At operation 802, the communication platform receives, from a client an in association with a thread associated with a first message in a first channel of a communication platform, a first request to create a second channel based at least in part on the thread. The client can be associated with a user computing device 104. In various examples, the communication platform can receive the first request via a second user interface element 158.

At operation 804, the communication platform identifies first characteristics associated with the thread (and/or the first channel). The first characteristics can include membership (e.g., associated users), context data (e.g., a number of messages, conversations, etc.), permissions (e.g., private, public, shared, etc.), features (e.g., title, name, topic, label, description, etc.), and the like that are associated with the thread and/or the first channel.

At operation 806, the communication platform determines whether to associate the first characteristics with the second channel. In various examples, the communication platform determines whether to use the first characteristics based on an input received via the second user interface element 158 or the third user interface element 300. For example, responsive to receiving an indication of selection of the second user interface element 158, the communication platform can automatically determine to associate the first characteristics with the second channel. For another example, the communication platform can determine whether to associate the first characteristics with the second channel based on an input received via the third user interface element 300, such as an input associated with a modification to one or more of the first characteristics.

Based on a determination to associate the first characteristics with the second channel ("Yes" at operation 806), the communication platform, at operation 808, creates (e.g., generates) the second channel including the first characteristics. After creation of the second channel, the data associated with the thread can be accessible to the members of the thread and the second channel via the second channel. Additionally, the data associated with the thread can be stored in association with the second channel, such as in channel data 130 of datastore 122.

At operation 810, in response to creating the second channel, the communication platform can cause an indicator associated with the second channel to be presented via a user interface associated with the communication platform that is presented via the client. As illustrated in FIGS. 2A and 2B above, the communication platform (e.g., channel management component 116) can cause the indicator associated with the new channel to be presented via the second subregion 202. In at least one example, if the user selects, or otherwise actuates, the indicator associated with the new channel, at least a portion of the context data can be presented via the second region 150 of the user interface 146. That is, based at least in part on detecting an input indication a selection, or other actuation, the indicator associated with the new channel, the communication platform can cause at least a portion of the context data to be presented via the second region 150 of the user interface 146, as a feed, for example.

Based on a determination to not associate the first characteristics with the second channel ("No" at operation 806), the communication platform, at operation 812, identifies second characteristics to associate with the second channel. In some examples, the second characteristics can include at least one characteristic that is different from the first characteristics. In some examples, the second characteristics can be identified based on input received via the third user interface element 300. In such examples, the input can represent a modification to at least one characteristic of the first characteristics. For example, the communication platform can receive an input corresponding to a request to set a permission associated with the second channel as private, where the corresponding permission associated with the thread and/or the first channel was public (e.g., a modification to the first characteristic).

At operation 814, the communication platform creates the second channel including the second characteristics. After creation of the second channel, at least a portion of the data associated with the thread can be accessible to at least a portion of the members of the thread (e.g., members of the second channel) via the second channel. Additionally, the data associated with the at least the portion of the thread can be stored in association with the second channel, such as in channel data 130 of datastore 122

After the second channel is created, the communication platform can cause an indicator associated with the second channel to be presented via a user interface associated with the communication platform that is presented via the client, as described above with respect to operation 810.

Figure 9:
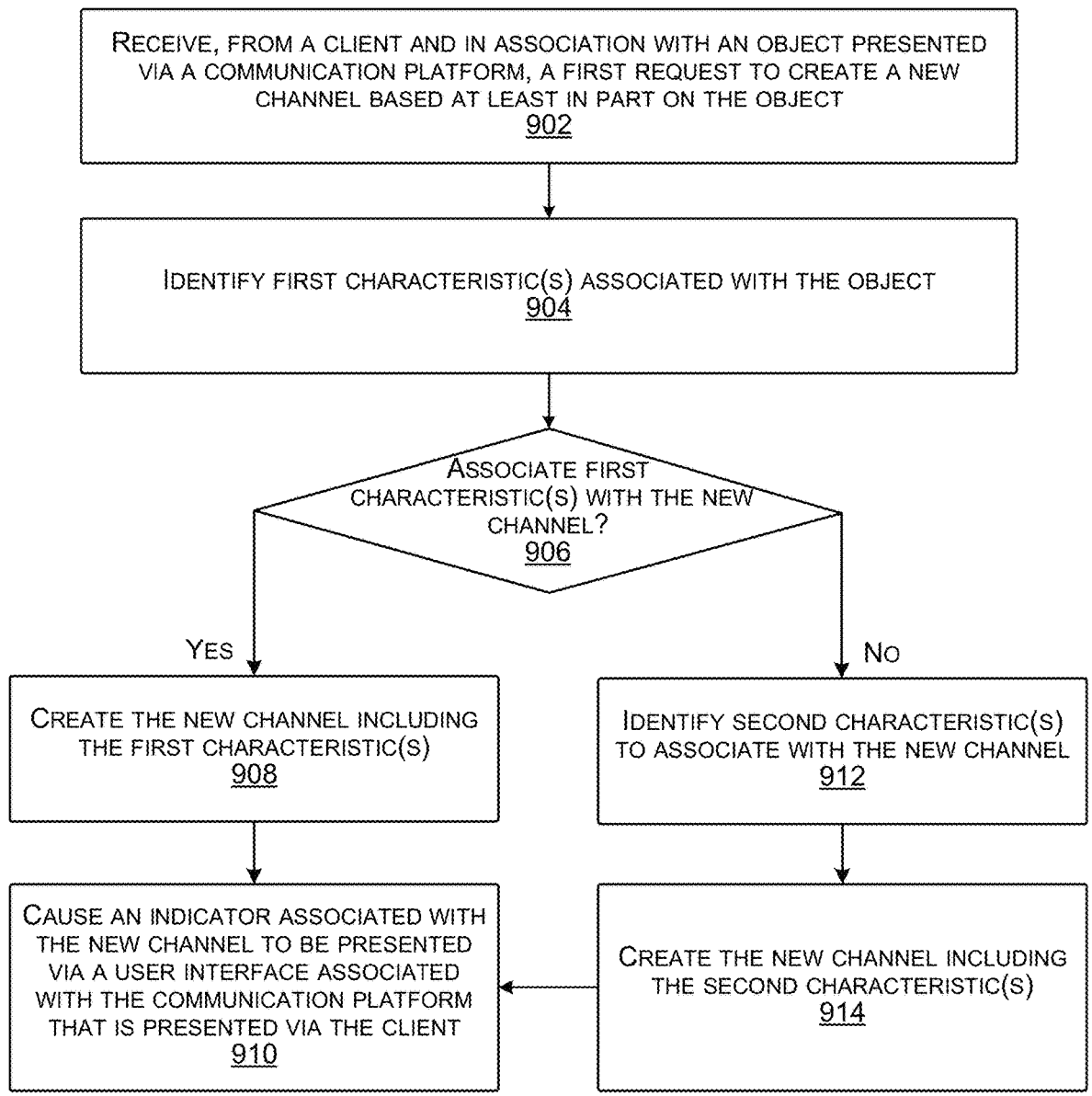
FIG. 9 illustrates an example process for determining characteristics to associate with a new channel created based on an object, as described herein.

FIG. 9 illustrates an example process 900 for determining characteristics to associate with a new channel created based on an object, as described herein.

At operation 902, the communication platform receives, from a client an in association with an object presented via the communication platform, a first request to create a second channel based at least in part on the object. The client can be associated with a user computing device 104. In various examples, the communication platform can receive the first request via a second user interface element 158.

In various examples, the object can include a file (e.g., document, photograph, etc.), an event, a link (e.g., hyperlink, deep link, etc.), or the like. In the illustrative example, the object includes a word processing document. However, this is not intended to be so limiting and the object can include any other type of object that can be accessible via the user interface 146. In some examples, the object can include a third-party object, such as that provided by a third-party resource and accessible via the communication platform. In such examples, the communication platform can access data associated with the object utilizing an application programming interface (API) associated with the third-party resource or other means for obtaining external data and can cause the presentation via the user interface 146. For example, an object could include a calendar object (e.g., event) associated with a calendar managed by a third-party service provider and accessible via the user interface 146.

In various examples, the object can be presented via a channel, such as to provide members of the channel to view and/or contribute to the object. In such examples, the object can be presented in a message feed of the channel, or in a window, thread, or other sidebar associated with the message feed. In some examples, the object can be presented in association with a workspace, board, huddle, or other collaboration resource associated with the communication platform.

At operation 904, the communication platform identifies first characteristics associated with the object. In some examples, the first characteristics associated with the object can include characteristics associated with a channel, workspace, board, or huddle via which the object is presented. In some examples, the first characteristics associated with the object can include characteristics that are determined and/or provided by a third-party resource, such as a service provider configured to store and/or manage the object remote from the communication platform. The first characteristics can include membership (e.g., associated users), context data (e.g., data in a body of the object, comments, highlights, etc.), permissions (e.g., private, public, users associated with editing functions, viewing functions, etc.), features (e.g., title, name, topic, label, description, etc.), and the like that are associated with the object.

At operation 906, the communication platform determines whether to associate the first characteristics with the new channel. In various examples, the communication platform determines whether to use the first characteristics based on an input received via a second user interface element 158 or the third user interface element 300 associated with the object. For example, responsive to receiving an indication of selection of the second user interface element 158 associated with the object, the communication platform can automatically determine to associate the first characteristics with the new channel. For another example, the communication platform can determine whether to associate the first characteristics with the second channel based on an input received via the third user interface element 300 associated with the object, such as an input associated with a modification to one or more of the first characteristics.

Based on a determination to associate the first characteristics with the second channel ("Yes" at operation 906), the communication platform, at operation 908, creates (e.g., generates) the second channel including the first characteristics. After creation of the second channel, the data associated with the object can be accessible to the members of the object and the second channel via the second channel. Additionally, the data associated with the object can be stored in association with the second channel, such as in channel data 130 of datastore 122.

At operation 910, in response to creating the second channel, the communication platform can cause an indicator associated with the second channel to be presented via a user interface associated with the communication platform that is presented via the client. As illustrated in FIGS. 2A and 2B above, the communication platform (e.g., channel management component 116) can cause the indicator associated with the new channel to be presented via the second sub-region 202. In at least one example, if the user selects, or otherwise actuates, the indicator associated with the new channel, at least a portion of the context data can be presented via the second region 150 of the user interface 146. That is, based at least in part on detecting an input indication a selection, or other actuation, the indicator associated with the new channel, the communication platform can cause at least a portion of the context data to be presented via the second region 150 of the user interface 146, as a feed, for example.

Based on a determination to not associate the first characteristics with the second channel ("No" at operation 906), the communication platform, at operation 912, identifies second characteristics to associate with the new channel. In some examples, the second characteristics can include at least one characteristic that is different from the first characteristics. In some examples, the second characteristics can be identified based on input received via the third user interface element 300, such as that presented in association with the object. In such examples, the input can represent a modification to at least one characteristic of the first characteristics. For example, the communication platform can receive an input corresponding to a request to modify the context data associated with the object to present comments associated with a word processing document and not the contents of the document itself.

At operation 914, the communication platform creates the second channel including the second characteristics. After creation of the second channel, at least a portion of the data associated with the object can be accessible to at least a portion of the members of the object (e.g., members of the second channel) via the second channel. Additionally, the data associated with the at least the portion of the object can be stored in association with the second channel, such as in channel data 130 of datastore 122.

After the second channel is created, the communication platform can cause an indicator associated with the second channel to be presented via a user interface associated with the communication platform that is presented via the client, as described above with respect to operation 910.

Figure 10:
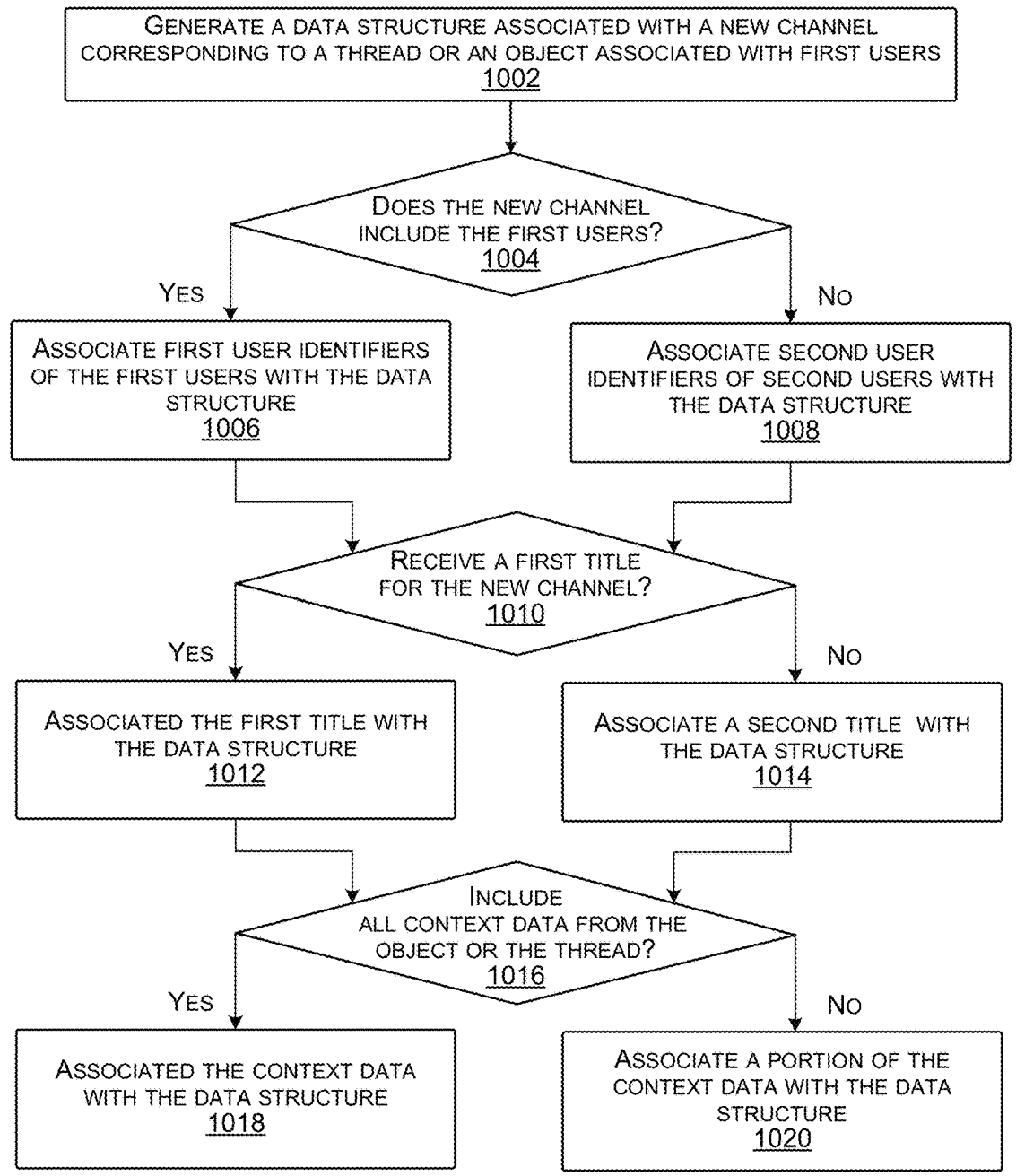
FIG. 10 illustrates an example process for creating a new channel, as described herein.

FIG. 10 illustrates an example process 1000 for creating a new channel, as described herein. As described above, the datastore 122 associated with the server(s) 102 can store data associated with threads (e.g., channel data 130) and/or objects (e.g., object data 132) and/or associated channels (e.g., channel data 130). In at least one example, individual threads, objects and/or channels can be associated with individual data structures, wherein indications of member(s), permission(s), context data, features, and/or other data (e.g., details, etc.) are associated therewith.

At operation 1002, the communication platform generates a data structure associated with a new channel corresponding to a thread or an object associated with first users. In some examples, the communication platform can generate the data structure responsive to receiving input associated with creating the new channel based on the thread or the object. That is, in some examples, the communication platform can generate the data structure responsive to receiving a request to generate the new channel based on the thread or the object.

At operation 1004, the communication platform determines whether the new channel includes the first users. The first users can include members of the thread or the object and/or a channel, workspace, board, huddle, or the like associated therewith. In some examples, the communication platform determines whether the new channel includes the first users responsive to receiving an input to modify membership of the new channel, such as to include a different membership than the membership associated with the thread or the object.

Based on a determination to include the first users ("Yes" at operation 1004), the communication platform, at operation 1006 associates first user identifiers of the first users with the data structure.

Based on a determination to not include the first users ("No" at operation 1004), the communication platform, at operation 1008 associates second user identifiers of second users with the data structure. In various examples, the communication platform determines the second users and/or the second user identifiers associated therewith based on input received via the third user interface element 300 presented in association with the thread or the object. In some examples, the input can include a modification to the membership of thread or the object, such as to associated additional or alternative users with the new channel.

At operation 1010, the communication platform determines whether a first title for the new channel is received. In various examples, the first title can be received as an input via the third user interface element 300, such as in a features section 302 thereof.

Based on a determination that the first title is received ("Yes" at operation 1010), the communication platform, at operation 1012 associates first title with the data structure.

Based on a determination that the first title is not received ("No" at operation 1010), the communication platform, at operation 1014 associates a second title with the data structure. The second title can include a title of the thread or the object, a thread identification, an object identification, or the like.

At operation 1016, the communication platform determines whether to include all of the context data from the object or the thread. As discussed above, the context data can include data associated with the thread or the object, such as messages, files shared, comments, highlights, and the like.

Based on a determination to include all of the context data ("Yes" at operation 1016), the communication platform, at operation 1018 associates all of the context data with the data structure.

Based on a determination to include a portion of the context data ("No" at operation 1016), the communication platform, at operation 1020 associates the portion of the context data with the data structure. In various examples, the communication platform can receive an indication of the portion of the context data (e.g., comments only, highlighted text only, a particular conversation, messages transmitted during a date/time range, the last 35 messages posted in a thread, most reacted-to messages, etc.) as an input via the third user interface element 300, such as in a context data section 304 thereof.

As described above with reference to FIGS. 1-10, techniques described herein are directed to streamlining channel generation based on a thread or an object presented via a communication platform. As described above, an expedited conversion process can reduce a total amount of computing resources required to generate the new channel with data previously published or made available via the communication platform. As such, the expedited conversion process improves the functioning of a user computing device. Additionally, at least because the techniques described herein can automatically identify context data and/or other characteristics to be associated with the channel based on the thread and/or object, the techniques described herein can reduce a total amount of network traffic required to generate a new channel based on a thread and/or object. As such, the techniques described herein can improve network bandwidth availability.

Example Clauses

A: A method, implemented at least in part by one or more computing devices of a communication platform, comprising: receiving, in association with a thread associated with a message in a first channel, a first request to create a second channel based at least in part on the thread; identifying one or more users that are associated with the thread and one or more messages associated with the thread; and creating the second channel comprising the one or more messages, wherein the one or more users that are members of the first channel are members of the second channel.

B: The method of paragraph A, further comprising: determining that a number of messages associated with the thread meets or exceeds a threshold number of messages; causing a presentation of a selectable option to create the second channel to be presented on a client of a user associated with the first channel; and receiving an indication of a selection of the selectable option to create the second channel.

C: The method of either paragraph A or paragraph B, further comprising: based at least in part on receiving the first request, sending, to a client associated with a user associated with the first channel, a second request to identify the one or more messages from a plurality of messages associated with the thread; receiving, from the client and based at least in part on the second request, a selection of the one or more messages; and displaying the selection of the one or more messages in the second channel.

D: The method of any one of paragraphs A-C, further comprising: based at least in part on receiving the first request, sending, to a client associated with a user associated with the first channel, a second request to identify a subset of the users for association with the second channel, wherein the second request comprises a list of the one or more users that are associated with the thread; receiving, from the client and based at least in part on the second request, a selection of the subset of the users from the list of the one or more users; and associating the subset of the users with the second channel based at least in part on the selection.

E: The method of paragraph D, further comprising: receiving, from the client and based at least in part on the second request, an input corresponding to a user identifier associated with a second user not previously associated with the thread; and based on a determination that the second user has permission to access the thread, associating the second user with the second channel.

F: The method of any one of paragraphs A-E, further comprising: receiving, in association with a third-party application presented via the communication platform, a second request to create a third channel based on the third-party application; identifying (i) a subset of the users that are associated with the third-party application and (ii) data associated with the third-party application to be associated with the third channel; and creating the third channel comprising the data associated with the third-party application, wherein the subset of the users are members of the third channel.

G: The method of paragraph F, further comprising receiving an indication to create the third channel based on one or more comments associated with the third-party application, wherein identifying data to be associated with the third-party application comprises identifying the one or more comments associated with the third-party application.

H: A system associated with a communication platform, wherein the system comprises: one or more processors; and one or more computer-readable media comprising instructions that, when executed by the one or more processors, cause the system to perform operations comprising: receiving, in association with a thread associated with a message in a first channel, a first request to create a second channel based at least in part on the thread; identifying one or more users that are associated with the thread and one or more messages associated with the thread; and creating the second channel comprising the one or more messages, wherein the one or more users that are members of the first channel are members of the second channel.

I: The system of paragraph H, the operations further comprising: determining that a number of messages associated with the thread meets or exceeds a threshold number of messages; causing a presentation of a selectable option to create the second channel to be presented on a client of a user associated with the first channel; and receiving an indication of a selection of the selectable option to create the second channel.

J: The system of either paragraph H or paragraph I, the operations further comprising: based at least in part on receiving the first request, sending, to a client associated with a user associated with the first channel, a second request to identify the one or more messages from a plurality of messages associated with the thread; receiving, from the client and based at least in part on the second request, a selection of the one or more messages; and displaying the selection of the one or more messages in the second channel.

K: The system of any one of paragraphs H-J, the operations further comprising: based at least in part on receiving the first request, sending, to a client associated with a user associated with the first channel, a second request to identify a subset of the users for association with the second channel, wherein the second request comprises a list of the one or more users that are associated with the thread; receiving, from the client and based at least in part on the second request, a selection of the subset of the users from the list of the one or more users; and associating the subset of the users with the second channel based at least in part on the selection.

L: The system of paragraph K, the operations further comprising receiving, from the client and based at least in part on the second request, an input corresponding to a user identifier associated with a second user not previously associated with the thread; and based on a determination that the second user has permission to access the thread, associating the second user with the second channel.

M: The system of any one of paragraphs H-L, the operations further comprising: receiving, in association with a third-party application presented via the communication platform, a second request to create a third channel based on the third-party application; identifying (i) a subset of the users that are associated with the third-party application and (ii) data associated with the third-party application to be associated with the third channel; and creating the third channel comprising the data associated with the third-party application, wherein the subset of the users are members of the third channel.

N: The system of any one of paragraphs H-M, the operations further comprising: receiving an indication to create the third channel based on one or more comments associated with the third-party application, wherein identifying data to be associated with the third-party application comprises identifying the one or more comments associated with the third-party application.

O: One or more computer-readable media comprising instructions that, when executed by one or more processors, cause the one or more processors to perform operations comprising: receiving, in association with a thread associated with a message in a first channel, a first request to create a second channel based at least in part on the thread; identifying one or more users that are associated with the thread and one or more messages associated with the thread; and creating the second channel comprising the one or more messages, wherein the one or more users that are members of the first channel are members of the second channel.

P: The one or more computer-readable media of paragraph O, the operations further comprising: determining that a number of messages associated with the thread meets or exceeds a threshold number of messages; causing a presentation of a selectable option to create the second channel to be presented on a client of a user associated with the first channel; and receiving an indication of a selection of the selectable option to create the second channel.

Q: The one or more computer-readable media of either paragraph O or paragraph P, the operations further comprising: based at least in part on receiving the first request, sending, to a client associated with a user associated with the first channel, a second request to identify the one or more messages from a plurality of messages associated with the thread; receiving, from the client and based at least in part on the second request, a selection of the one or more messages; and displaying the selection of the one or more messages in the second channel.

R: The one or more computer-readable media of any one of paragraphs O-Q, the operations further comprising: based at least in part on receiving the first request, sending, to a client associated with a user associated with the first channel, a second request to identify a subset of the users for association with the second channel, wherein the second request comprises a list of the one or more users that are associated with the thread; receiving, from the client and based at least in part on the second request, a selection of the subset of the users from the list of the one or more users; and associating the subset of the users with the second channel based at least in part on the selection.

S: The one or more computer-readable media of paragraph R, the operations further comprising: receiving, from the client and based at least in part on the second request, an input corresponding to a user identifier associated with a second user not previously associated with the thread; and based on a determination that the second user has permission to access the thread, associating the second user with the second channel.

T: The one or more computer-readable media of any one of paragraphs O-S, the operations further comprising: receiving, in association with a third-party application presented via the communication platform, a second request to create a third channel based on the third-party application; identifying (i) a subset of the users that are associated with the third-party application and (ii) data associated with the third-party application to be associated with the third channel; and creating the third channel comprising the data associated with the third-party application, wherein the subset of the users are members of the third channel.

While the example clauses described above are described with respect to one particular implementation, it should be understood that, in the context of this document, the content of the example clauses can also be implemented via a method, device, system, a computer-readable medium, and/or another implementation. Additionally, any of paragraphs A-T may be implemented alone or in combination with any other one or more of the paragraphs A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, implemented at least in part by one or more computing devices of a communication platform, the method comprising:
generating, based at least in part on selection of a user interface element associated with a message that is related to a first topic and that is posted in a first channel of the communication platform, a thread for the message, wherein the thread maintains communications, relating to the message, between users of the first channel;
receiving, in association with the thread and a user profile associated with the communication platform, a first request to create a second channel based at least in part on a first subset of the communications that are determined to be related to the first topic and that are less than an entirety of the communications, wherein the second channel is different from the first channel;
generating, based at least in part on the first request, a user interface for presentation to a device associated with the user profile, the user interface presenting a first option for the user profile to identify membership for the second channel, a second option for the user profile to select one or more communications for inclusion within the second channel, and a third option to identify characteristics that are to be applied to the second channel, the characteristics including at least one of a title of the second channel or one or more permissions for the second channel;
identifying, based at least in part on receiving, via the user interface, first input indicating the membership for the second channel and second input indicating the one or more communications, one or more users that are associated with the thread and one or more first messages that are associated with the first subset of the communications;
receiving, via the user interface and in association with the user profile, the characteristics:
creating the second channel comprising the one or more first messages, wherein at least a second subset of the one or more users that are members of the first channel are members of the second channel;
associating the characteristics with the second channel;
determining a third subset of the communications that are related to a second topic that is different than the first topic;
identifying a third channel that is existing in the communication platform and that is related to the second topic;
determining one or more second messages associated with the third subset of communications; and
adding the one or more second messages to the third channel, wherein at least a fourth subset of the one or more users that are members of the first channel are members of the third channel.

2. The method of claim 1, further comprising:
determining that a number of messages associated with the thread meets or exceeds a threshold number of messages;
causing a presentation of a selectable option to create the second channel to be presented on a client of a user associated with the first channel; and
receiving an indication of a second selection of the selectable option to create the second channel.

3. The method of claim 1, further comprising:
based at least in part on receiving the first request, sending, to a client associated with a user associated with the first channel, a third request to identify the one or more first messages from a plurality of messages associated with the thread;
receiving, from the client and based at least in part on the third request, a second selection of the one or more first messages; and
displaying the second selection of the one or more first messages in the second channel.

4. The method of claim 1, further comprising:
based at least in part on receiving the first request, sending, to a client associated with a user associated with the first channel, a third request to identify the second subset of the one or more users for association with the second channel, wherein the third request comprises a list of the one or more users that are associated with the thread;
receiving, from the client and based at least in part on the third request, a second selection of the second subset of the one or more users from the list of the one or more users; and
associating the second subset of the one or more users with the second channel based at least in part on the second selection.

5. The method of claim 4, further comprising:
receiving, from the client and based at least in part on the third request, a third input corresponding to a user identifier associated with a second user not previously associated with the thread; and based at least in part on a determination that the second user has permission to access the thread, associating the second user with the second channel.

6. The method of claim 1, further comprising:

receiving, in association with a third-party application presented via the communication platform, a third request to create a fourth channel based at least in part on the third-party application;

identifying (i) a fifth subset of users that are associated with the third-party application and (ii) data associated with the third-party application to be associated with the fourth channel; and creating the fourth channel comprising the data associated with the third-party application, wherein the fifth subset of the users are members of the fourth channel.

7. The method of claim 6, further comprising:

receiving an indication to create the fourth channel based at least in part on one or more comments associated with the third-party application, wherein identifying data to be associated with the third-party application comprises identifying the one or more comments associated with the third-party application.

8. A system associated with a communication platform, wherein the system comprises:

one or more processors; and one or more computer-readable media comprising instructions that, when executed by the one or more processors, cause the system to perform operations comprising:

generating, based at least in part on selection of a user interface element associated with a message that is related to a first topic and that is posted in a first channel of the communication platform, a thread for the message, wherein the thread maintains communications, relating to the message, between users of the first channel;

receiving, in association with the thread and a user profile associated with the communication platform, a first request to create a second channel based at least in part on a first subset of the communications that are determined to be related to the first topic and that are less than an entirety of the communications, wherein the second channel is different from the first channel;

generating, based at least in part on the first request, a user interface for presentation to a device associated with the user profile, the user interface presenting a first option for the user profile to identify membership for the second channel, a second option for the user profile to select one or more communications for inclusion within the second channel, and a third option to identify characteristics that are to be applied to the second channel, the characteristics including at least one of a title of the second channel or one or more permissions for the second channel;

identifying, based at least in part on receiving, via the user interface, first input indicating the membership for the second channel and second input indicating the one or more communications, one or more users that are associated with the thread and one or more first messages that are associated with the first subset of the communications;

receiving, via the user interface and in association with the user profile, the characteristics;

creating the second channel comprising the one or more first messages, wherein at least a second subset of the one or more users that are members of the first channel are members of the second channel;

associating the characteristics with the second channel;

determining a third subset of the communications that are related to a second topic that is different than the first topic;

identifying a third channel that is existing in the communication platform and that is related to the second topic;

determining one or more second messages associated with the third subset of communications; and adding the one or more second messages to the third channel, wherein at least a fourth subset of the one or more users that are members of the first channel are members of the third channel.

9. The system of claim 8, the operations further comprising:

determining that a number of messages associated with the thread meets or exceeds a threshold number of messages;

causing a presentation of a selectable option to create the second channel to be presented on a client of a user associated with the first channel; and receiving an indication of a second selection of the selectable option to create the second channel.

10. The system of claim 8, the operations further comprising:

based at least in part on receiving the first request, sending, to a client associated with a user associated with the first channel, a third request to identify the one or more first messages from a plurality of messages associated with the thread;

receiving, from the client and based at least in part on the third request, a second selection of the one or more first messages; and displaying the second selection of the one or more first messages in the second channel.

11. The system of claim 8, the operations further comprising:

based at least in part on receiving the first request, sending, to a client associated with a user associated with the first channel, a third request to identify the second subset of the one or more users for association with the second channel, wherein the third request comprises a list of the one or more users that are associated with the thread;

receiving, from the client and based at least in part on the third request, a second selection of the second subset of the one or more users from the list of the one or more users; and associating the second subset of the one or more users with the second channel based at least in part on the second selection.

12. The system of claim 11, the operations further comprising receiving, from the client and based at least in part on the third request, a third input corresponding to a user identifier associated with a second user not previously associated with the thread; and based at least in part on a determination that the second user has permission to access the thread, associating the second user with the second channel.

13. The system of claim 8, the operations further comprising:

receiving, in association with a third-party application presented via the communication platform, a third request to create a fourth channel based at least in part on the third-party application;

identifying (i) a fifth subset of users that are associated with the third-party application and (ii) data associated with the third-party application to be associated with the fourth channel; and creating the fourth channel comprising the data associated with the third-party application, wherein the fifth subset of the users are members of the fourth channel.

14. The system of claim 13, the operations further comprising:

receiving an indication to create the fourth channel based at least in part on one or more comments associated with the third-party application, wherein identifying data to be associated with the third-party application comprises identifying the one or more comments associated with the third-party application.

15. One or more computer-readable media comprising instructions that, when executed by one or more processors of a computing device of a communication platform, cause the computing device to perform operations comprising:

generating, based at least in part on selection of a user interface element associated with a message that is related to a first topic and that is posted in a first channel of the communication platform, a thread for the message, wherein the thread maintains communications, relating to the message, between users of the first channel;

receiving, in association with the thread and a user profile associated with the communication platform, a first request to create a second channel based at least in part on a first subset of the communications that are determined to be related to the first topic and that are less than an entirety of the communications, wherein the second channel is different from the first channel;

generating, based at least in part on the first request, a user interface for presentation to a device associated with the user profile, the user interface presenting a first option for the user profile to identify membership for the second channel, a second option for the user profile to select one or more communications for inclusion within the second channel, and a third option to identify characteristics that are to be applied to the second channel, the characteristics including at least one of a title of the second channel or one or more permissions for the second channel;

identifying, based at least in part on receiving, via the user interface, first input indicating the membership for the second channel and second input indicating the one or more communications, one or more users that are associated with the thread and one or more first messages that are associated with the first subset of the communications;

receiving, via the user interface and in association with the user profile, the characteristics;

creating the second channel comprising the one or more first messages, wherein at least a second subset of the one or more users that are members of the first channel are members of the second channel;

associating the characteristics with the second channel;

determining a third subset of the communications that are related to a second topic that is different than the first topic;

identifying a third channel that is existing in the communication platform and that is related to the second topic;

determining one or more second messages associated with the third subset of communications; and adding the one or more second messages to the third channel, wherein at least a fourth subset of the one or more users that are members of the first channel are members of the third channel.

16. The one or more computer-readable media of claim 15, the operations further comprising:

determining that a number of messages associated with the thread meets or exceeds a threshold number of messages;

causing a presentation of a selectable option to create the second channel to be presented on a client of a user associated with the first channel; and receiving an indication of a second selection of the selectable option to create the second channel.

17. The one or more computer-readable media of claim 15, the operations further comprising:

based at least in part on receiving the first request, sending, to a client associated with a user associated with the first channel, a third request to identify the one or more first messages from a plurality of messages associated with the thread;

receiving, from the client and based at least in part on the third request, a second selection of the one or more first messages; and displaying the second selection of the one or more first messages in the second channel.

18. The one or more computer-readable media of claim 15, the operations further comprising:

based at least in part on receiving the first request, sending, to a client associated with a user associated with the first channel, a third request to identify the second subset of the one or more users for association with the second channel, wherein the third request comprises a list of the one or more users that are associated with the thread;

receiving, from the client and based at least in part on the third request, a second selection of the second subset of the one or more users from the list of the one or more users; and associating the second subset of the one or more users with the second channel based at least in part on the second selection.

19. The one or more computer-readable media of claim 18, the operations further comprising:

receiving, from the client and based at least in part on the third request, third input corresponding to a user identifier associated with a second user not previously associated with the thread; and based at least in part on a determination that the second user has permission to access the thread, associating the second user with the second channel.

20. The one or more computer-readable media of claim 15, the operations further comprising:

receiving, in association with a third-party application presented via the communication platform, a third request to create a fourth channel based at least in part on the third-party application;

identifying (i) a fifth subset of users that are associated with the third-party application and (ii) data associated with the third-party application to be associated with the fourth channel; and creating the fourth channel comprising the data associated with the third-party application, wherein the fifth subset of the users are members of the fourth channel.

* * * * *